US010750442B2

(12) United States Patent
Heidler et al.

(10) Patent No.: US 10,750,442 B2
(45) Date of Patent: *Aug. 18, 2020

(54) LOCAL POWER MANAGEMENT FOR REMOTE ANTENNA UNITS IN DISTRIBUTED ANTENNA SYSTEMS

(71) Applicant: CORNING OPTICAL COMMUNICATIONS LLC, Hickory, NC (US)

(72) Inventors: Christian Heidler, Hohenschaeftlarn (DE); Jonathan Richard Hull, Baldwinsville, NY (US); Jessica Joy Kedziora, Shirley, MA (US); Michael Sauer, Corning, NY (US); Wolfgang Gottfried Tobias Schweiker, Weyarn (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,094

(22) Filed: Aug. 7, 2019

(65) Prior Publication Data

US 2019/0364498 A1 Nov. 28, 2019

Related U.S. Application Data

(63) Continuation of application No. 16/148,420, filed on Oct. 1, 2018, now Pat. No. 10,420,025, which is a (Continued)

(51) Int. Cl.
*H04W 52/02* (2009.01)
*H04B 10/11* (2013.01)
(Continued)

(52) U.S. Cl.
CPC ........ *H04W 52/0206* (2013.01); *H01Q 1/007* (2013.01); *H02J 4/00* (2013.01);
(Continued)

(58) Field of Classification Search
CPC .... H04B 10/11; H04B 10/25753; H04B 1/16; H04W 52/0206; H04W 88/085
(Continued)

(56) References Cited

U.S. PATENT DOCUMENTS 5,436,827 A 7/1995 Gunn et al.
5,682,256 A 10/1997 Motley et al.
(Continued)

FOREIGN PATENT DOCUMENTS

CN 101299517 A 11/2008
CN 101803246 A 8/2010
(Continued)

OTHER PUBLICATIONS

International Search Report of the Interantional Searching Authority; PCT/IL2014/050766; dated Nov. 11, 2014.
(Continued)

*Primary Examiner* — Emmanuel Bayard
(74) *Attorney, Agent, or Firm* — C. Keith Montgomery

(57) ABSTRACT

Power management for remote units in a distributed communication system. Power can be managed for a remote unit configured to power modules and devices that may require more power to operate than power available to the remote unit. For example, the remote unit may be configured to include power-consuming remote unit modules to provide distributed antenna system-related services. As another example, the remote unit may be configured to provide power through powered ports in the remote unit to external power-consuming devices. Depending on the configuration of the remote unit, the power-consuming remote unit mod-
(Continued)

ules and/or external power-consuming devices may demand more power than is available at the remote unit. In this instance, the power available at the remote unit can be distributed to the power-consuming modules and devices based on the priority of services desired to be provided by the remote unit.

19 Claims, 15 Drawing Sheets

Related U.S. Application Data continuation of application No. 15/613,913, filed on Jun. 5, 2017, now Pat. No. 10,104,610, which is a continuation of application No. 14/845,946, filed on Sep. 4, 2015, now Pat. No. 9,699,723, which is a continuation of application No. 13/859,985, filed on Apr. 10, 2013, now Pat. No. 9,160,449, which is a continuation of application No. PCT/US2011/055858, filed on Oct. 12, 2011.

(60) Provisional application No. 61/392,660, filed on Oct. 13, 2010.

(51) Int. Cl.
| | | |
|---|---|---|
| *H04B 1/16* | (2006.01) | |
| *H02J 4/00* | (2006.01) | |
| *H04B 10/2575* | (2013.01) | |
| *H04B 10/80* | (2013.01) | |
| *H01Q 1/00* | (2006.01) | |
| *H04W 88/08* | (2009.01) | |

(52) U.S. Cl.
CPC .............. *H04B 1/16* (2013.01); *H04B 10/11* (2013.01); *H04B 10/25753* (2013.01); *H04B 10/808* (2013.01); *H04W 88/085* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/166* (2018.01); *Y02D 70/46* (2018.01)

(58) Field of Classification Search
USPC .................................................. 375/219–220
See application file for complete search history.

(56) References Cited

U.S. PATENT DOCUMENTS

| | | | |
|---|---|---|---|
| 6,188,876 | B1 | 2/2001 | Kim |
| 6,353,600 | B1 | 3/2002 | Schwartz et al. |
| 6,405,018 | B1 | 6/2002 | Reudink et al. |
| 6,496,290 | B1 | 12/2002 | Lee |
| 6,937,878 | B2 | 8/2005 | Kim et al. |
| 7,072,586 | B2 | 7/2006 | Aburakawa et al. |
| 7,144,255 | B2 | 12/2006 | Seymour |
| 7,177,728 | B2 | 2/2007 | Gardner |
| 7,269,311 | B2 | 9/2007 | Kim et al. |
| 7,388,892 | B2 | 6/2008 | Nishiyama et al. |
| 7,515,526 | B2 | 4/2009 | Elkayam et al. |
| 7,526,303 | B2 | 4/2009 | Chary |
| 7,567,579 | B2 | 7/2009 | Korcharz et al. |
| 7,587,559 | B2 | 9/2009 | Brittain et al. |
| 7,627,250 | B2 | 12/2009 | George et al. |
| 7,650,519 | B1 | 1/2010 | Hobbs et al. |
| 8,001,397 | B2 | 8/2011 | Hansalia |
| 8,036,157 | B2 * | 10/2011 | Hanabusa ............... H04W 8/00 370/328 |
| 8,155,525 | B2 | 4/2012 | Cox |
| 8,270,990 | B2 | 9/2012 | Zhao |
| 8,306,563 | B2 | 11/2012 | Lavadslcy et al. |
| 8,328,145 | B2 | 12/2012 | Smith |
| 8,406,941 | B2 | 3/2013 | Smith |
| 8,417,979 | B2 | 4/2013 | Maroney |
| 8,457,562 | B2 | 6/2013 | Zavadsky et al. |
| 8,532,492 | B2 | 9/2013 | Palanisamy et al. |
| 8,588,614 | B2 | 11/2013 | Larsen |
| 8,605,394 | B2 | 12/2013 | Crookham et al. |
| 8,620,375 | B2 | 12/2013 | Kim et al. |
| 8,649,684 | B2 | 2/2014 | Casterline et al. |
| 8,744,390 | B2 | 6/2014 | Stratford |
| 8,830,035 | B2 | 9/2014 | Lindley et al. |
| 8,831,428 | B2 | 9/2014 | Kobyakov et al. |
| 8,831,593 | B2 | 9/2014 | Melester et al. |
| 8,855,832 | B2 | 10/2014 | Rees |
| 8,930,736 | B2 | 1/2015 | James |
| 8,971,903 | B2 | 3/2015 | Hossain et al. |
| 8,994,276 | B2 | 3/2015 | Recker et al. |
| 9,026,036 | B2 | 5/2015 | Saban et al. |
| 9,160,449 | B2 | 10/2015 | Heidler et al. |
| 9,240,835 | B2 | 1/2016 | Berlin et al. |
| 9,252,874 | B2 | 2/2016 | Heidler et al. |
| 9,419,712 | B2 | 8/2016 | Heidler et al. |
| 9,532,329 | B2 | 12/2016 | Sauer |
| 9,673,904 | B2 | 6/2017 | Palanisamy et al. |
| 9,699,723 | B2 | 7/2017 | Heidler et al. |
| 10,020,885 | B2 | 7/2018 | Mizrahi et al. |
| 10,104,610 | B2 | 10/2018 | Heidler et al. |
| 10,404,099 | B1 | 9/2019 | Bonja et al. |
| 10,405,356 | B2 | 9/2019 | Hazani et al. |
| 10,420,025 | B2 * | 9/2019 | Heidler .................. H04B 10/11 |
| 2002/0097031 | A1 | 7/2002 | Cook et al. |
| 2004/0230846 | A1 | 11/2004 | Mancey et al. |
| 2005/0047030 | A1 | 3/2005 | Lee |
| 2005/0226625 | A1 | 10/2005 | Wake et al. |
| 2006/0053324 | A1 | 3/2006 | Giat et al. |
| 2007/0058332 | A1 | 3/2007 | Canterbury et al. |
| 2007/0286599 | A1 | 12/2007 | Sauer et al. |
| 2008/0070502 | A1 | 3/2008 | George et al. |
| 2008/0080863 | A1 | 4/2008 | Sauer et al. |
| 2008/0164890 | A1 | 7/2008 | Admon et al. |
| 2008/0166094 | A1 | 7/2008 | Bookbinder et al. |
| 2008/0167931 | A1 | 7/2008 | Gerstemeier et al. |
| 2008/0186143 | A1 | 8/2008 | George et al. |
| 2008/0252307 | A1 | 10/2008 | Schindler |
| 2009/0007192 | A1 | 1/2009 | Singh |
| 2009/0040027 | A1 | 2/2009 | Nakao |
| 2009/0055672 | A1 | 2/2009 | Burkland et al. |
| 2009/0100275 | A1 | 4/2009 | Chang et al. |
| 2009/0121548 | A1 | 5/2009 | Schindler et al. |
| 2009/0169163 | A1 | 7/2009 | Abbott, III et al. |
| 2009/0304387 | A1 | 12/2009 | Farries et al. |
| 2010/0054746 | A1 | 3/2010 | Logan |
| 2010/0106985 | A1 | 4/2010 | Panguluri et al. |
| 2010/0290787 | A1 | 11/2010 | Cox |
| 2011/0266999 | A1 | 11/2011 | Yodfat et al. |
| 2011/0268446 | A1 | 11/2011 | Cune et al. |
| 2011/0268452 | A1 | 11/2011 | Beamon et al. |
| 2012/0033676 | A1 | 2/2012 | Mundra et al. |
| 2012/0120995 | A1 | 5/2012 | Wurth |
| 2012/0196611 | A1 | 8/2012 | Venkatraman et al. |
| 2012/0214538 | A1 | 8/2012 | Kim et al. |
| 2012/0293390 | A1 | 11/2012 | Shoemaker et al. |
| 2012/0317426 | A1 | 12/2012 | Hunter, Jr. et al. |
| 2013/0046415 | A1 | 2/2013 | Curtis |
| 2013/0128929 | A1 | 5/2013 | Clevorn et al. |
| 2013/0132683 | A1 | 5/2013 | Ajanovic et al. |
| 2013/0188959 | A1 | 7/2013 | Cune et al. |
| 2013/0295980 | A1 | 11/2013 | Reuven et al. |
| 2013/0330086 | A1 | 12/2013 | Berlin et al. |
| 2013/0337750 | A1 | 12/2013 | Ko |
| 2014/0024402 | A1 | 1/2014 | Singh |
| 2014/0037294 | A1 | 2/2014 | Cox et al. |
| 2014/0087742 | A1 | 3/2014 | Brower et al. |
| 2014/0089688 | A1 | 3/2014 | Man et al. |
| 2014/0097846 | A1 | 4/2014 | Lemaire et al. |
| 2014/0146692 | A1 * | 5/2014 | Hazani ............... H04W 52/0206 370/252 |
| 2014/0148214 | A1 | 5/2014 | Sasson |

(56) References Cited

U.S. PATENT DOCUMENTS

| | | |
|---|---|---|
| 2014/0153919 A1 | 6/2014 | Casterline et al. |
| 2014/0158781 A1 | 6/2014 | Kates |
| 2014/0233442 A1 | 8/2014 | Atias et al. |
| 2014/0243033 A1 | 8/2014 | Wala et al. |
| 2014/0293894 A1 | 10/2014 | Saban et al. |
| 2015/0126251 A1 | 5/2015 | Hunter, Jr. et al. |
| 2016/0352393 A1 | 12/2016 | Berlin et al. |
| 2017/0054496 A1 | 2/2017 | Hazani |
| 2017/0070975 A1 | 3/2017 | Ranson et al. |
| 2018/0351633 A1 | 12/2018 | Birkmeir et al. |

FOREIGN PATENT DOCUMENTS

| | | | |
|---|---|---|---|
| EP | 924881 | A2 | 6/1999 |
| GB | 2275834 | A | 9/1994 |
| KR | 20040053467 | A | 6/2004 |
| WO | 2001084760 | A1 | 11/2001 |
| WO | 2005117337 | A1 | 12/2005 |
| WO | 2006077569 | A1 | 7/2006 |
| WO | 2009014710 | A1 | 1/2009 |
| WO | 2009145789 | A1 | 12/2009 |
| WO | 2010132292 | A1 | 11/2010 |
| WO | 2012071367 | A1 | 5/2012 |

OTHER PUBLICATIONS

International Search Report of the Interantional Searching Authority; PCT/IL2014/051012; dated Mar. 5, 2015.
International Search Report of the Interantional Searching Authority; PCT/US2011/055858; dated Feb. 7, 2012.
MOS SDx Packaged Stations, Technical Manual, MOS 05-6312A01, Rev. B, May 2011, XP-002717790, 14 Pages.
Patent Cooperation Treaty, International Preliminary Report on Patentability for Application No. PCT/US2011/055861, dated Apr. 26, 2013, 8 Pages.
CN201180052537.7 Notice of First Office Action dated Jun. 25, 2015.
Thevenin Equivalent Circuits; https://web.archive.org/web/20100325213607/http://www.facstaff.buckne . . . ; 15 Pages.
Non-Final Office Action for U.S. Appl. No. 16/203,520, dated Nov. 21, 2019, 16 pages.
Notice of Allowance for U.S. Appl. No. 16/203,520, dated Jan. 21, 2020, 13 pages.

* cited by examiner

LOCAL POWER MANAGEMENT FOR REMOTE ANTENNA UNITS IN DISTRIBUTED ANTENNA SYSTEMS

PRIORITY APPLICATIONS

This application is a continuation U.S. application Ser. No. 16/148,420, filed Oct. 1, 2018, which is a continuation of U.S. application Ser. No. 15/613,913, filed Jun. 5, 2017, now U.S. Pat. No. 10,104,610, which is a continuation of U.S. application Ser. No. 14/845,946, filed Sep. 4, 2015, now U.S. Pat. No. 9,699,723, which is a continuation of U.S. application Ser. No. 13/859,985, filed Apr. 10, 2013, now U.S. Pat. No. 9,160,449, which is a continuation of International Application No. PCT/US11/55858, filed Oct. 12, 2011, which claims the benefit of priority to U.S. Provisional Application No. 61/392,660, filed on Oct. 13, 2010, all of which are incorporated herein by reference in their entireties.

RELATED APPLICATIONS

The present application is related to U.S. application Ser. No. 13/860,017 filed Apr. 10, 2013, now U.S. Pat. No. 9,252,874, and entitled "Power Management For Remote Antenna Units In Distributed Antenna Systems," which claims priority to U.S. Provisional Application Ser. No. 61/392,687, filed on Oct. 13, 2010 and entitled "Power Management For Remote Antenna Units In Distributed Antenna Systems," both of which are incorporated herein by reference in their entireties.

The present application is also related to U.S. Provisional Application Ser. No. 61/330,386 filed on May 2, 2010 and entitled "Providing Digital Data Services in Optical Fiber-Based Distributed Radio Frequency (RF) Communications Systems, and Related Components and Methods," which is incorporated herein by reference in its entirety.

The present application is also related to U.S. patent application Ser. No. 12/892,424, now abandoned, filed on Sep. 28, 2010 and entitled "Providing Digital Data Services in Optical Fiber-Based Distributed Radio Frequency (RF) Communications Systems, and Related Components and Methods," which is incorporated herein by reference in its entirety.

The present application is also related to U.S. Provisional Application Ser. No. 61/230,463 filed on Jul. 31, 2009 and entitled "Optical Fiber-Based Distributed Antenna Systems, Components, and Related Methods for Calibration Thereof," which is incorporated herein by reference in its entirety.

The present application is also related to U.S. Provisional Application Ser. No. 61/230,472 filed on Jul. 31, 2009 and entitled "Optical Fiber-Based Distributed Antenna Systems, Components, and Related Methods for Monitoring the Status Thereof," which is incorporated herein by reference in its entirety.

BACKGROUND

Field of the Disclosure

The technology of the disclosure relates to power management in remote antenna units in distributed antenna systems for distributing radio frequency (RF) signals to the remote antenna units.

Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." The antenna coverage areas are provided by remote antenna units in the distributed antenna system. Remote antenna units can provide antenna coverage areas having radii in the range from a few meters up to twenty (20) meters as an example. If the antenna coverage areas provided each cover a small area, there are typically only a few users (clients) per antenna coverage area. This allows for minimizing the amount of RF bandwidth shared among the wireless system users. It may be desirable to provide antenna coverage areas in a building or other facility to provide indoor distributed antenna system access to clients within the building or facility. It may also be desirable to employ optical fiber to distribute RF communications signals to provide an optical fiber-based distributed antenna system. Distribution of RF communications signals over optical fiber can include Radio-over-Fiber (RoF) distribution. Benefits of optical fiber include increased bandwidth.

Remote antenna units may contain power-consuming circuits and other components that are involved in processing RF communications signals. For example, remote antenna units provided in an optical-fiber based distributed antenna system may include electrical-to-optical (E/O) converters and optical-to-electrical (O/E) converters that require power to operate. The E/O and O/E converters convert downlink optical RF communications signals to downlink electrical RF communications signals and uplink electrical RF communications signals to uplink optical RF communications signals, respectively. Other power-consuming components may be included in the remote antenna unit. A local power source can be provided at the remote antenna units to supply power to power-consuming components in the remote antenna units. Alternatively, to avoid providing a local power source, a remote power source can be provided that provides power over power lines routed to the remote antenna units. The power lines may be provided in separate cabling or bundled in a hybrid cable with communications lines routed to the remote antenna units.

It is important that a sufficient amount of power be provided to the remote antenna unit to properly power the power-consuming components provided therein. Otherwise, the power-consuming components in the remote antenna unit may not properly operate and may not provide intended services for the distributed antenna system. In the case of multiple power-consuming components provided in a remote antenna unit, power provided to the remote antenna unit is split among the multiple components. In this case, it is also important that the power be managed to sufficiently power each of the power-consuming components.

SUMMARY OF THE DETAILED DESCRIPTION

Embodiments disclosed in the detailed description include power management for a remote antenna unit(s) (RAUs) in a distributed antenna system, and related devices, systems, methods, and computer-readable media. The distributed antenna system may distribute radio frequency (RF)

communications signals to RAUs for communicating to client devices. As a non-limiting example, the distributed antenna system may be an optical fiber-based distributed antenna system. Power can be managed for an RAU configured to power modules and devices that may require more power to operate than power available to the RAU. For example, the RAU may be configured to include power-consuming RAU modules to provide distributed antenna system-related services. As another example, the RAU may be configured to provide power to external power-consuming devices through powered ports in the RAU. Depending on the configuration of the RAU, the power-consuming RAU modules and/or external power-consuming devices may demand more power than is available at the RAU. In this instance, the power available at the RAU can be distributed to the power-consuming modules and devices based on the priority of services desired to be provided by the RAU.

In one embodiment, an RAU for a distributed antenna system is provided. The RAU comprises at least one power-consuming RAU module. As non-limiting examples, the at least one power-consuming RAU module may be comprised of at least one of an RF communications module configured to provide RF communications services, and a digital data services (DDS) module configured to provide DDS. The RAU further comprises at least one powered port configured to provide power to at least one external power-consuming device connected to the at least one powered port. The RAU also comprises a controller. The controller is configured to determine an available power budget for the at least one powered port. The controller is also configured to enable power for the at least one powered port if the available power budget is sufficient to power the at least one external power-consuming device connected to the at least one powered port.

In another embodiment, a method of managing power consumed at an RAU in a distributed antenna system is provided. The method comprises determining an available power budget for at least one powered port configured to provide power to at least one external power-consuming device connected to the at least one powered port based on power required by at least one power-consuming RAU module. As non-limiting examples, the at least one power-consuming RAU module may be comprised of at least one of an RF communications module configured to provide RF communications services, and a digital data services (DDS) module configured to provide DDS. The method also comprises enabling power for the at least one powered port if an available power budget is sufficient to power the at least one external power-consuming device connected to the at least one powered port.

In another embodiment, a computer-readable medium is provided. The computer-readable medium stores one or more programs, the one or more programs comprising instructions, which when executed by a controller in an RAU provided in a distributed antenna system, cause the controller to determine an available power budget for at least one powered port in an RAU provided in a distributed antenna system, the RAU configured to provide power to at least one external power-consuming device connected to the at least one powered port based on power required by at least one power-consuming RAU module. As non-limiting examples, the at least one power-consuming RAU module may be comprised of at least one of an RF communications module configured to provide RF communications services, and a digital data services (DDS) module configured to provide DDS. The instructions further cause the controller to enable power for the at least one powered port if an available power budget is sufficient to power the at least one external power-consuming device connected to the at least one powered port.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include power management for a remote antenna unit(s) (RAUs) in a distributed antenna system, and related devices, systems, methods, and computer-readable media. The distributed antenna system may distribute radio frequency (RF) communications signals to RAUs for communicating to client devices. As a non-limiting example, the distributed antenna system may be an optical fiber-based distributed antenna system. Power can be managed for an RAU configured to power modules and devices that may require more power to operate than power available to the RAU. For example, the RAU may be configured to include power-consuming RAU modules to provide distributed antenna system related services. As another example, the RAU may be configured to provide power to external power-consuming devices through powered ports in the RAU. Depending on the configuration of the RAU, the power-consuming RAU modules and/or external power-consuming devices may demand more power than is available at the RAU. In this instance, the power available at the RAU can be distributed to the power-consuming modules and devices based on the priority of services desired to be provided by the RAU.

Before discussing power management for RAUs provided in distributed antenna systems and related components and methods starting at FIG. 5, FIGS. 1-4 are provided and first discussed below. FIGS. 1-4 provide examples of distributed antenna systems, including those according to the embodiments described herein.

Figure 1:
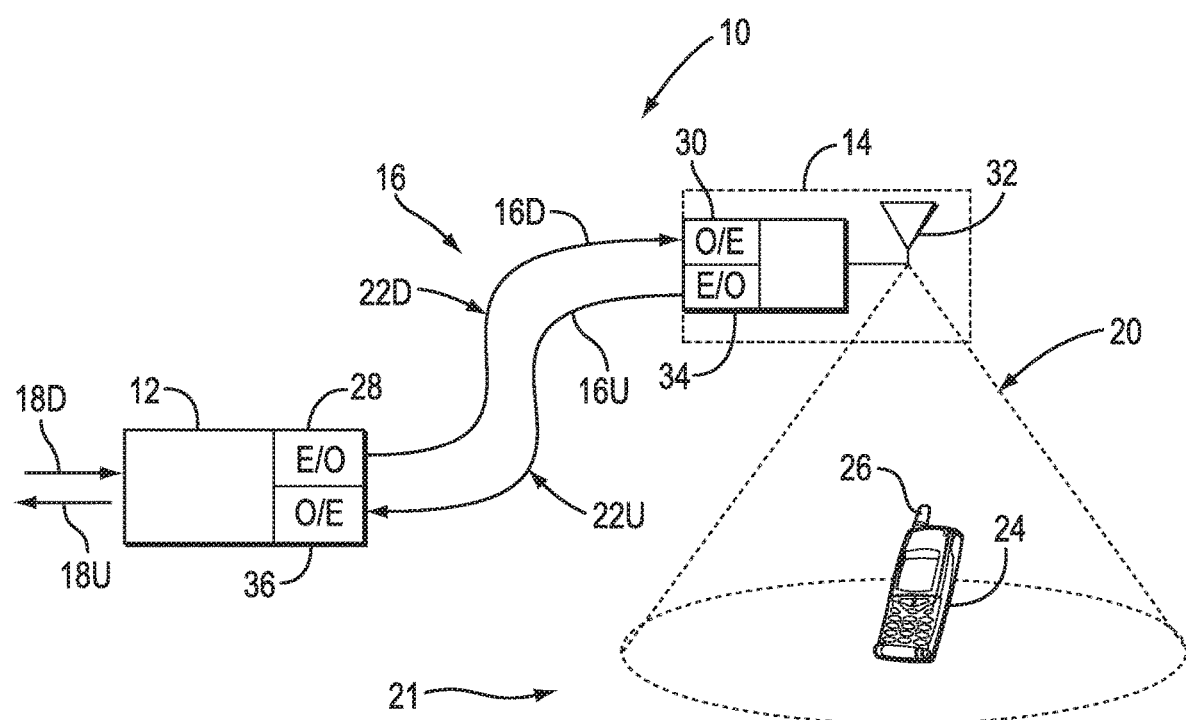
FIG. 1 is a schematic diagram of an exemplary distributed antenna system.

FIG. 1 is a schematic diagram of an exemplary distributed antenna system. In this embodiment, the distributed antenna system is an optical fiber-based distributed antenna system 10; however, other types of distributed antenna systems are also possible. The optical fiber-based distributed antenna system 10 is configured to create one or more antenna coverage areas for establishing communications with wireless client devices located in the RF range of the antenna coverage areas. The optical fiber-based distributed antenna system 10 provides RF communications services (e.g., cellular services). In this embodiment, the optical fiber-based distributed antenna system 10 includes head end equipment in the form of a head-end unit (HEU) 12, one or more remote antenna units (RAUs) 14, and an optical fiber 16 that optically couples the HEU 12 to the RAU 14. The HEU 12 is configured to receive communications over downlink electrical RF communications signals 18D from a source or sources, such as a network or carrier as examples, and provide such communications to the RAU 14. The HEU 12 is also configured to return communications received from the RAU 14, via uplink electrical RF communications signals 18U, back to the source or sources. In this regard in this embodiment, the optical fiber 16 includes at least one downlink optical fiber 16D to carry signals communicated from the HEU 12 to the RAU 14 and at least one uplink optical fiber 16U to carry signals communicated from the RAU 14 back to the HEU 12.

The optical fiber-based distributed antenna system 10 has an antenna coverage area 20 that can be substantially centered about the RAU 14. The antenna coverage area 20 of the RAU 14 forms an RF coverage area 21. The HEU 12 is adapted to perform or to facilitate any one of a number of Radio-over-Fiber (RoF) applications, such as radio frequency identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF communications signals.

With continuing reference to FIG. 1, to communicate the electrical RF communications signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF communications signals 18D to downlink optical RF communications signals 22D to be communicated over the downlink optical fiber 16D. The RAU 14 includes an optical-to-electrical (O/E) converter 30 to convert received downlink optical RF communications signals 22D back to electrical RF communications signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF communications signals representing the wireless RF communications to an E/O converter 34 in the RAU 14. The E/O converter 34 converts the electrical RF communications signals into uplink optical RF communications signals 22U to be communicated over the uplink optical fiber 16U. An 0/E converter 36 provided in the HEU 12 converts the uplink optical RF communications signals 22U into uplink electrical RF communications signals, which can then be communicated as uplink electrical RF communications signals 18U back to a network or other source. The HEU 12 in this embodiment is not able to distinguish the location of the client device 24 in this embodiment. The client device 24 could be in the range of any antenna coverage area 20 formed by an RAU 14.

Figure 2:
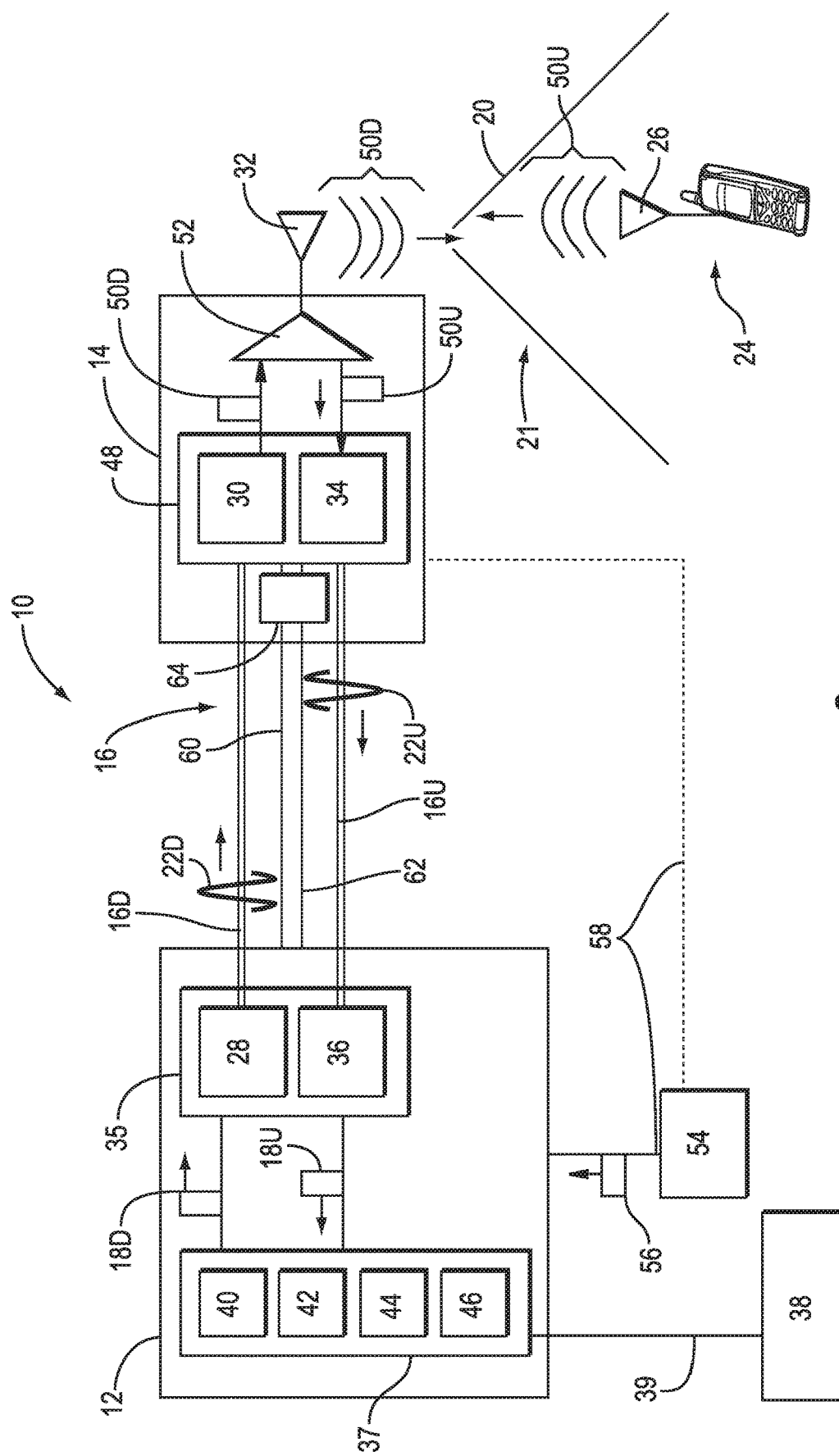
FIG. 2 is a more detailed schematic diagram of exemplary head-end equipment and a remote antenna unit (RAU) that can be deployed in the distributed antenna system of FIG. 1.

FIG. 2 is a more detailed schematic diagram of the exemplary optical fiber-based distributed antenna system 10 of FIG. 1 that provides electrical RF service signals for a particular RF service or application. In an exemplary embodiment, the HEU 12 includes a service unit 37 that provides electrical RF service signals by passing (or conditioning and then passing) such signals from one or more outside networks 38 via a network link 39. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF communications signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF communications signals 18D from the service unit 37 and converts them to corresponding downlink optical RF communications signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEU 12 also includes the O/E converter 36, which is electrically coupled to the service unit 37. The O/E converter 36 receives the uplink optical RF communications signals 22U and converts them to corresponding uplink electrical RF communications signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEU 12 can include an RF communications signal conditioner unit 40 for conditioning the downlink electrical RF communications signals 18D and the uplink electrical RF communications signals 18U, respectively. The service unit 37 can include a digital signal processing unit ("digital signal processor") 42 for providing to the RF communications signal conditioner unit 40 an electrical signal that is modulated onto an RF carrier to generate a desired downlink electrical RF communications signal 18D. The digital signal processor 42 is also configured to process a demodulation signal provided by the demodulation of the uplink electrical RF communications signal 18U by the RF communications signal conditioner unit 40. The service unit 37 in the HEU 12 can also include an optional head-end unit controller (HEC) 44 (or "controller 44") for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF communications signals 22D from the HEU 12 back into downlink electrical RF communications signals 50D. The E/O converter 34 converts uplink electrical RF communications signals 50U received from the client device 24 into the uplink optical RF communications signals 22U to be communicated to the HEU 12. The O/E converter 30 and the E/O converter 34 are electrically coupled to the antenna 32 via an RF signal-directing element 52, such as a circulator for example. The RF signal-directing element 52 serves to direct the downlink electrical RF communications signals 50D and the uplink electrical RF communications signals 50U, as discussed below. In accordance with an exemplary embodiment, the antenna 32 can include any type of antenna, including but not limited to one or more patch antennas, such as disclosed in U.S. patent application Ser. No. 11/504,999, filed Aug. 16, 2006, entitled "Radio-over-Fiber Transponder With A Dual-Band Patch Antenna System," and U.S. patent application Ser. No. 11/451,553, filed Jun. 12, 2006, entitled "Centralized Optical Fiber-based Wireless Picocellular Systems and Methods," both of which are incorporated herein by reference in their entireties.

With continuing reference to FIG. 2, the optical fiber-based distributed antenna system 10 also includes a power supply 54 that provides an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and that are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEU 12. In another example embodiment, the electrical power line 58 includes more than two wires and may carry multiple voltages.

Figure 3:
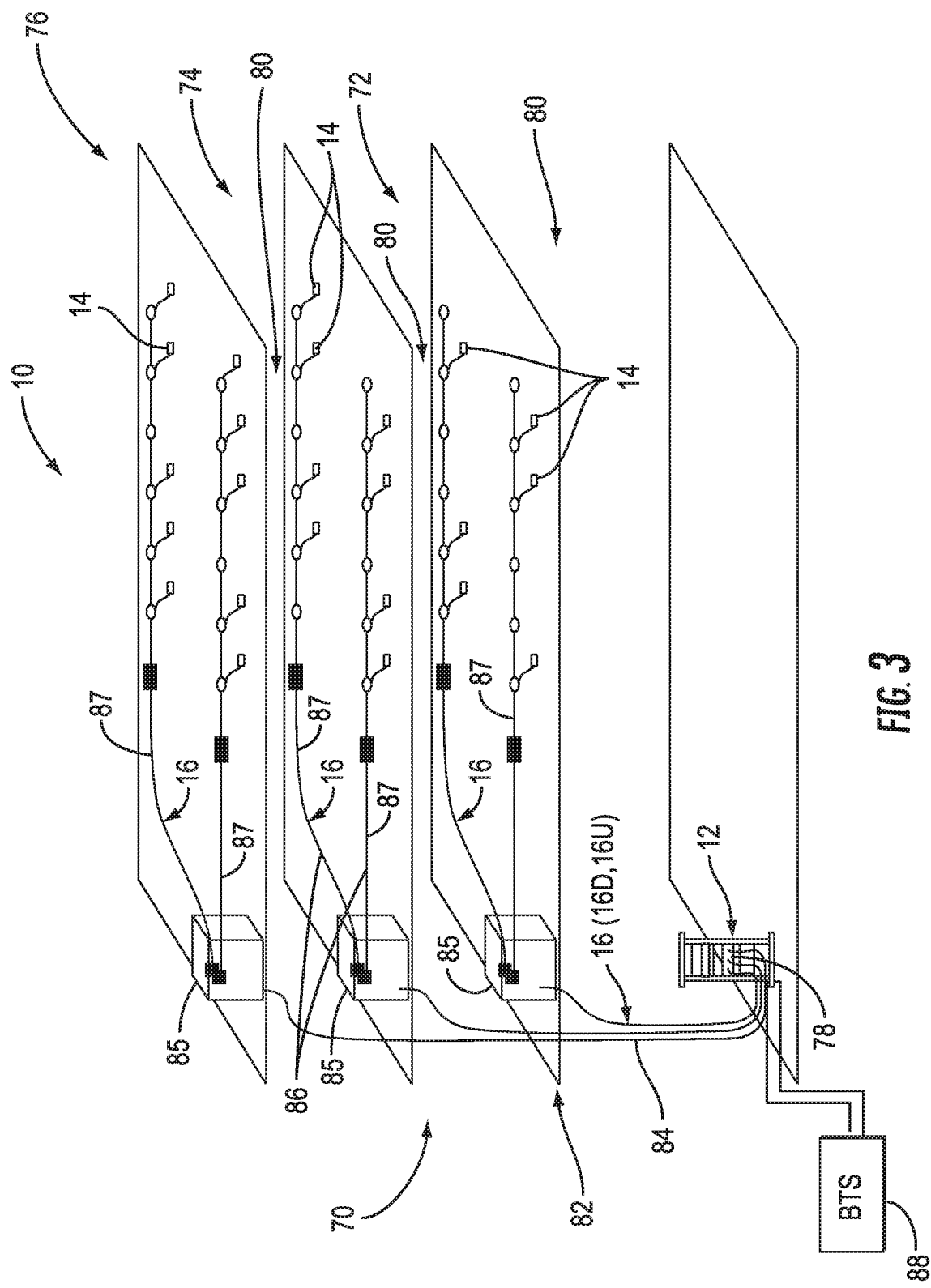
FIG. 3 is a partially schematic cut-away diagram of an exemplary building infrastructure in which the distributed antenna system in FIG. 1 can be employed.

To provide further exemplary illustration of how an optical fiber-based distributed antenna system can be deployed indoors, FIG. 3 is provided. FIG. 3 is a partially schematic cut-away diagram of a building infrastructure 70 employing an optical fiber-based distributed antenna system. The system may be the optical fiber-based distributed antenna system 10 of FIGS. 1 and 2. The building infrastructure 70 generally represents any type of building in which the optical fiber-based distributed antenna system 10 can be deployed. As previously discussed with regard to FIGS. 1 and 2, the optical fiber-based distributed antenna system 10 incorporates the HEU 12 to provide various types of communications services to coverage areas within the building infrastructure 70, as an example. For example, as discussed in more detail below, the optical fiber-based distributed antenna system 10 in this embodiment is configured to receive wireless RF communications signals and convert the RF communications signals into RoF signals to be communicated over the optical fiber 16 to multiple RAUs 14. The optical fiber-based distributed antenna system 10 in this embodiment can be, for example, an indoor distributed antenna system (IDAS) to provide wireless service inside the building infrastructure 70. These wireless signals can include cellular service, wireless services such as RFID tracking, Wireless Fidelity (WiFi), local area network (LAN), WLAN, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEU 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables the multiple optical fiber cables 86 to be distributed throughout the building infrastructure 70 (e.g., fixed to the ceilings or other support surfaces of each floor 72, 74, 76) to provide the antenna coverage areas 80 for the first, second, and third floors 72, 74, and 76. In an example embodiment, the HEU 12 is located within the building infrastructure 70 (e.g., in a closet or control room), while in another example embodiment, the HEU 12 may be located outside of the building infrastructure 70 at a remote location. A base transceiver station (BTS) 88, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell, and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater or picocell as other examples.

The optical fiber-based distributed antenna system 10 in FIGS. 1-3 and described above provides point-to-point communications between the HEU 12 and the RAU 14. Each RAU 14 communicates with the HEU 12 over a distinct downlink and uplink optical fiber pair to provide the point-to-point communications. Whenever an RAU 14 is installed in the optical fiber-based distributed antenna system 10, the RAU 14 is connected to a distinct downlink and uplink optical fiber pair connected to the HEU 12. The downlink and uplink optical fibers 16U, 16D may be provided in a fiber optic cable. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14. One downlink optical fiber 16 could be provided to support multiple channels each using wavelength-division multiplexing (WDM), as discussed in U.S. patent application Ser. No. 12/892,424 entitled "Providing Digital Data Services in Optical Fiber-Based Distributed Radio Frequency (RF) Communications Systems, and Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

Figure 4:
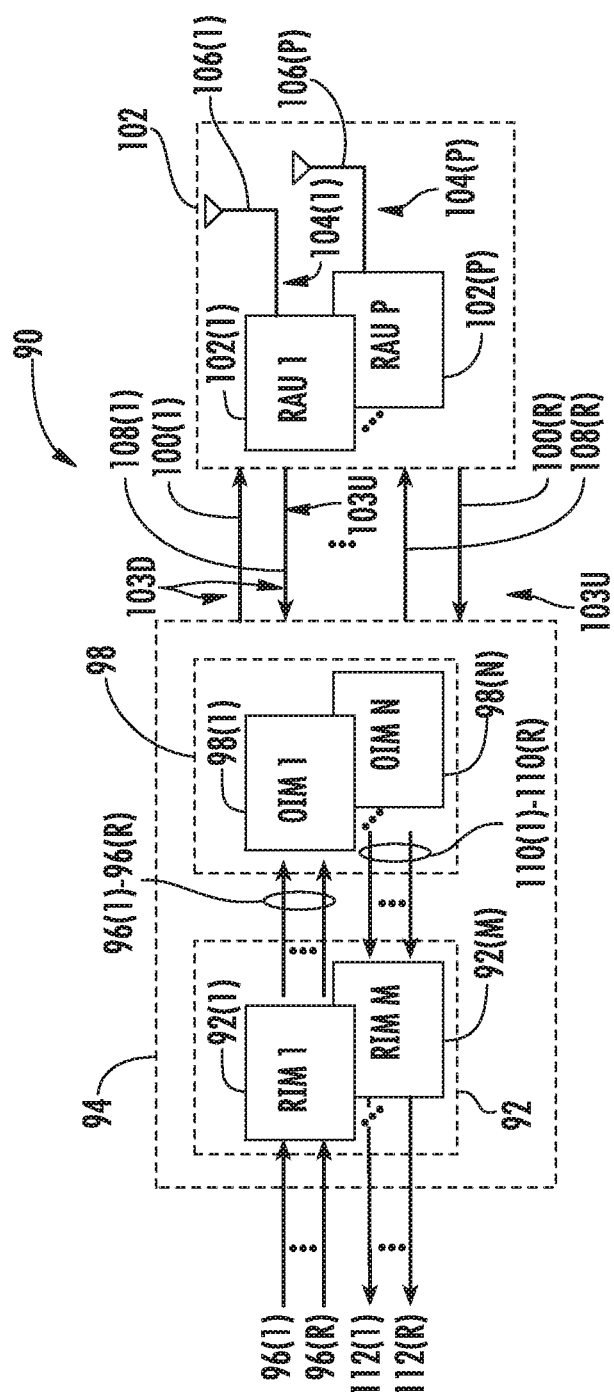
FIG. 4 is a schematic diagram of another exemplary distributed antenna system.

FIG. 4 is a schematic diagram of another exemplary distributed antenna system 90. In this embodiment, the distributed antenna system 90 is an optical fiber-based distributed antenna system comprised of three main components. One or more radio interfaces provided in the form of radio interface modules (RIMs) 92(1)-92(M) in this embodiment are provided in an HEU 94 to receive and process downlink electrical RF communications signals 96(1)-96(R) prior to optical conversion into downlink optical RF communications signals. The processing of the downlink electrical RF communications signals 96(1)-96(R) can include any of the processing previously described above in the HEU 12 in FIG. 2. The notations "1-R" and "1-M" indicate that any number of the referenced component, 1-R and 1-M, respectively, may be provided. As will be described in more detail below, the HEU 94 is configured to accept a plurality of RIMs 92(1)-92(M) as modular components that can easily be installed and removed or replaced in the HEU 94. In one embodiment, the HEU 94 is configured to support up to four (4) RIMs 92(1)-92(M) as an example.

Each RIM 92(1)-92(M) can be designed to support a particular type of radio source or range of radio sources (i.e., frequencies) to provide flexibility in configuring the HEU 94 and the optical fiber-based distributed antenna system 90 to support the desired radio sources. For example, one RIM 92 may be configured to support the Personal Communication Services (PCS) radio band. Another RIM 92 may be configured to support the 700 MHz radio band. In this example, by inclusion of these RIMs 92, the HEU 94 would be configured to support and distribute RF communications signals on both PCS and LTE 700 radio bands. RIMs 92 may be provided in the HEU 94 that support any frequency bands desired, including but not limited to US Cellular band, PCS (Personal Communication Services) ban, AWS (Advanced Wireless Services) band, 700 MHz band, Global System for Mobile communications (GSM) 900, GSM 1800, UMTS. RIMs 92 may be provided in the HEU 94 that support any wireless technologies desired, including but not limited to CDMA (Code Division Multiple Access), CDMA200, 1xRTT, EV-DO (Evolution-Data Only), UMTS (Universal Mobile Telecommunication System), HSPA (High-speed Packet Access), GSM, GPRS (General Packet Radio Services), EDGE (Enhanced Data GSM Environment), TDMA (Time Division Multiple Access), LTE (Long Term Evolution), iDEN, and CDPD (Cellular Digital Packet Data).

RIMs 92 may be provided in the HEU 94 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink). EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 96(1)-96(R) are provided to a plurality of optical interfaces provided in the form of optical interface modules (OIMs) 98(1)-98(N) in this embodiment to convert the downlink electrical RF communications signals 96(1)-96(N) into downlink optical signals 100(1)-100(R). The notation "1-N" indicates that any number of the referenced component 1-N may be provided. The OIMs 98 may be configured to provide one or more optical interface components (OICs) that contain O/E and E/O converters, as will be described in more detail below. The OIMs 98 support the radio bands that can be provided by the RIMs 92, including the examples previously described above. Thus, in this embodiment, the OIMs 98 may support a radio band range from 400 MHz to 2700 MHz, as an example, so providing different types or models of OIMs 98 for narrower radio bands to support possibilities for different radio band-supported RIMs 92 provided in the HEU 94 is not required. Further, as an example, the OIMs 98s may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 98(1)-98(N) each include E/O converters to convert the downlink electrical RF communications signals 96(1)-96(R) to downlink optical signals 100(1)-100(R). The downlink optical signals 100(1)-100(R) are communicated over downlink optical fiber(s) 103D to a plurality of RAUs 102(1)-102(P). The notation "1-P" indicates that any number of the referenced component 1-P may be provided. O/E converters provided in the RAUs 102(1)-102(P) convert the downlink optical signals 100(1)-100(R) back into downlink electrical RF communications signals 96(1)-96(R), which are provided over links 104(1)-104(P) coupled to antennas 106(1)-106(P) in the RAUs 102(1)-102(P) to client devices in the reception range of the antennas 106(1)-106(P).

E/O converters are also provided in the RAUs 102(1)-102(P) to convert uplink electrical RF communications signals received from client devices through the antennas 106(1)-106(P) into uplink optical signals 108(1)-108(R) to be communicated over uplink optical fibers 103U to the OIMs 98(1)-98(N). The OIMs 98(1)-98(N) include O/E converters that convert the uplink optical signals 108(1)-108(R) into uplink electrical RF communications signals 110(1)-110(R) that are processed by the RIMs 92(1)-102(M) and provided as uplink electrical RF communications signals 112(1)-112(R).

It may be desirable to provide both digital data services and RF communications services for client devices. For example, it may be desirable to provide digital data services and RF communications services in the building infrastructure 70 (FIG. 3) to client devices located therein. Wired and wireless devices may be located in the building infrastructure 70 that are configured to access digital data services. Examples of digital data services include, but are not limited to, Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

Figure 5:
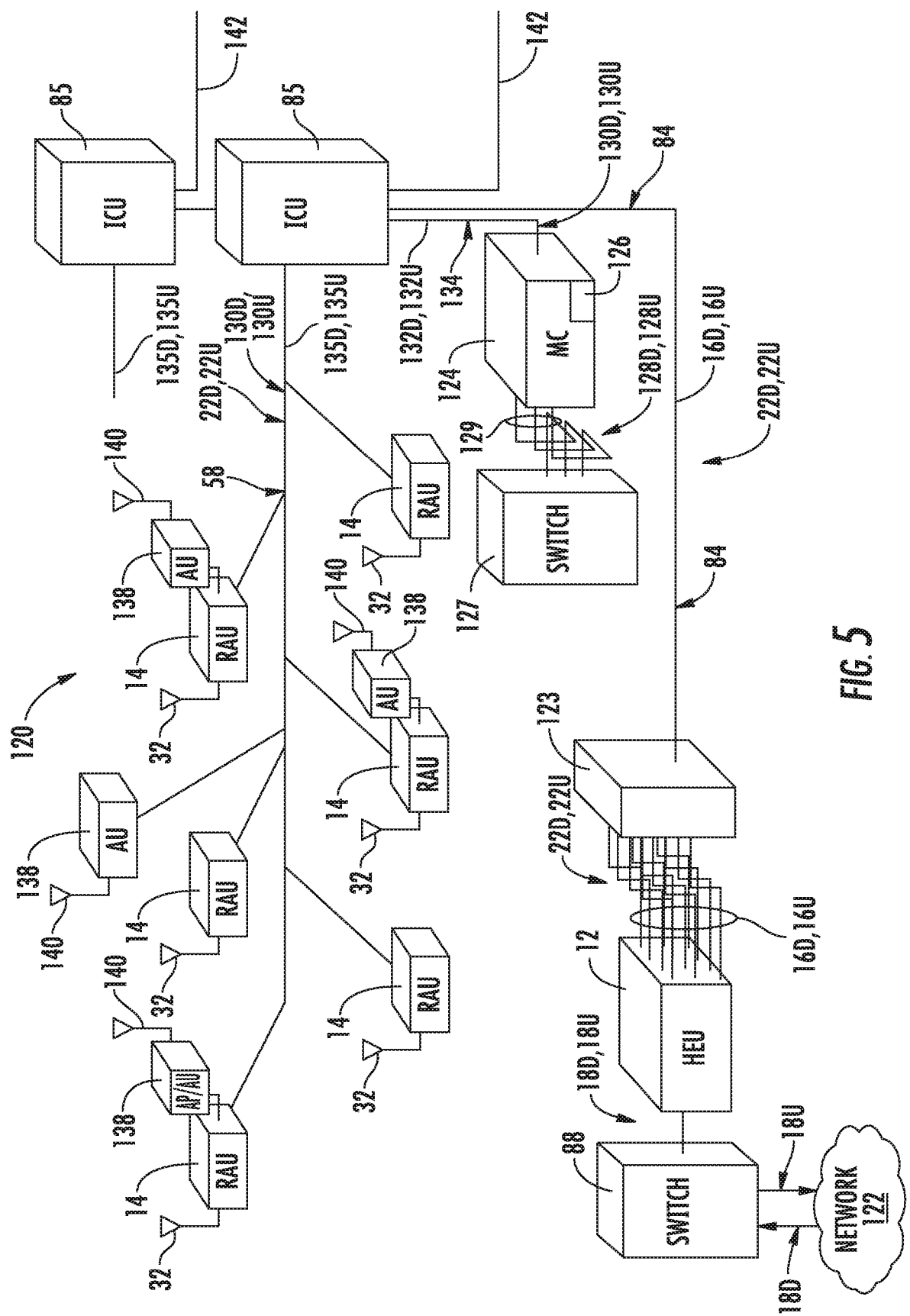
FIG. 5 is a schematic diagram of an exemplary embodiment of providing digital data services to RAUs in a distributed antenna system.

FIG. 5 is a schematic diagram of an exemplary embodiment of providing digital data services over separate downlink and uplink optical fibers from RF communications services to RAUs in an optical fiber-based distributed antenna system 120. The optical fiber-based distributed antenna system 120 is described as including some components provided in the optical fiber-based distributed antenna system 10 of FIGS. 1-3. These common components are illustrated in FIG. 5 with common element numbers with FIGS. 1-3. However, note that the optical fiber-based distributed antenna system 120 could also employ other components, including those in the optical fiber-based distributed antenna system 90 in FIG. 4.

As illustrated in FIG. 5, the HEU 12 is provided. The HEU 12 receives the downlink electrical RF communications signals 18D from the BTS 88. As previously discussed, the HEU 12 converts the downlink electrical RF communications signals 18D to downlink optical RF communications signals 22D to be distributed to the RAUs 14. The HEU 12 is also configured to convert the uplink optical RF communications signals 22U received from the RAUs 14 into uplink electrical RF communications signals 18U to be provided to the BTS 88 and onto a network 122 connected to the BTS 88. A patch panel 123 may be provided to receive the downlink and uplink optical fibers 16D, 16U configured to carry the downlink and uplink optical RF communications signals 22D, 22U. The downlink and uplink optical fibers 16D, 16U may be bundled together in one or more riser cables 84 and provided to one or more ICUs 85, as previously discussed and illustrated in FIG. 3.

To provide digital data services in the optical fiber-based distributed antenna system 120 in this embodiment, a digital data services controller (also referred to as "DDS controller") 124 in the form of a media converter in this example is provided. The DDS controller 124 can include only a media converter for provision media conversion functionality or can include additional functionality to facilitate digital data services. The DDS controller 124 is configured to provide digital data services over a communications link, interface, or other communications channel or line, which may be either wired, wireless, or a combination of both. The DDS controller 124 may include a housing configured to house digital media converters (DMCs) 126 to interface to a DDS switch 127 to support and provide digital data services. For example, the DDS switch 127 could be an Ethernet switch. The DDS switch 127 may be configured to provide Gigabit (Gb) Ethernet digital data service as an example. The DMCs 126 are configured to convert electrical digital signals to optical digital signals, and vice versa. The DMCs 126 may be configured for plug and play installation (i.e., installation and operability without user configuration required) into the DDS controller 124. For example, the DMCs 126 may include Ethernet input connectors or adapters (e.g., RJ-45) and optical fiber output connectors or adapters (e.g., LC, SC, ST, MTP).

With continuing reference to FIG. 5, the DDS controller 124 (via the DMCs 126) in this embodiment is configured to convert downlink electrical digital signals (or downlink electrical digital data services signals) 128D over digital line cables 129 from the DDS switch 127 into downlink optical digital signals (or downlink optical digital data services signals) 130D that can be communicated over downlink optical fiber 135D to RAUs 14. The DDS controller 124 (via the DMCs 126) is also configured to receive uplink optical digital signals 130U from the RAUs 14 via the uplink optical fiber 135U and convert the uplink optical digital signals 130U into uplink electrical digital signals 128U to be communicated to the DDS switch 127. In this manner, the digital data services can be provided over optical fiber as part of the optical fiber-based distributed antenna system 120 to provide digital data services in addition to RF communication services. Client devices located at the RAUs 14 can access these digital data services and/or RF communications services depending on their configuration. Exemplary digital data services include Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet.

With continuing reference to FIG. 5, in this embodiment, downlink and uplink optical fibers 132D, 132U are provided in a fiber optic cable 134 that is interfaced to the ICU 85. The ICU 85 provides a common point in which the downlink and uplink optical fibers 132D, 132U carrying digital optical signals can be bundled with the downlink and uplink optical fibers 16U, 16D carrying optical RF communications signals. One or more of the fiber optic cables 134, also referenced herein as array cables 134, can be provided containing the downlink and uplink optical fibers 135D, 135U for RF communications services and digital data services to be routed and provided to the RAUs 14. Any combination of services or types of optical fibers can be provided in the array cable 134. For example, the array cable 134 may include single mode and/or multi-mode optical fibers for RF communication services and/or digital data services.

Examples of ICUs that may be provided in the optical fiber-based distributed antenna system 120 to distribute both downlink and uplink optical fibers 135D, 135U for RF communications services and digital data services are described in U.S. patent application Ser. No. 12/466,514, filed on May 15, 2009, entitled "Power Distribution Devices, Systems, and Methods For Radio-Over-Fiber (RoF) Distributed Communication," and U.S. Provisional Application Ser. No. 61/330,385 filed on May 2, 2010, entitled "Power Distribution in Optical Fiber-Based Distributed Communications Systems Providing Digital Data and Radio Frequency (RF) Communications Services, and Related Components and Methods," both of which are incorporated herein by reference in their entireties.

With continuing reference to FIG. 5, some RAUs 14 can be connected to access units (AUs) 138, which may be access points (APs) or other devices supporting digital data services. AUs 138 can also be connected directly to the HEU 12. AUs 138 are illustrated, but the AUs 138 could be any other device supporting digital data services. In the example of AUs, the AUs 138 provide access to the digital data services provided by the DDS switch 127. This is because the downlink and uplink optical fibers 135D, 135U carrying downlink and uplink optical digital signals 130D, 130U converted from downlink and uplink electrical digital signals 128D, 128U from the DDS switch 127 are provided to the AUs 138 via the array cables 134 and RAUs 14. Digital data client devices can access the AUs 138 to access digital data services provided through the DDS switch 127. The AUs 138 may also each include an antenna 140 to provide wireless access to digital data services provided through the DDS switch 127.

As will be described in more detail below, providing RF communications services and digital data services involves providing RF communications modules and DDS modules in the RAUs 14 and/or AUs 138 in the example of FIG. 5. These modules are power-consuming modules that require power to operate. Power distributed to the RAUs can also be used to provide access to power for DDS modules, as opposed to providing separate power sources for DDS modules and RF communications modules. For example, power distributed to the RAUs 14 in FIG. 5 by or through the ICUs 85 can also be used to provide power to the AUs 138 located at the RAUs 14 in the optical fiber-based distributed antenna system 120. In this regard, the ICUs 85 may be configured to provide power for both RAUs 14 and the AUs 138 over an electrical power line 142, as illustrated in FIG. 5. As will also be described in more detail below, the RAUs 14 and/or AUs 138 may also be configured with powered ports to provide power to external client devices connected to the powered ports, such as IEEE 802.3af Power-over-Ethernet (PoE) compatible devices as an example. However, referring to FIG. 5 as an example, the power made available to the RAUs 14 and AUs 138 may not be sufficient to power all of the modules provided and external devices connected to the RAUs 14 and AUs 138.

In this regard, embodiments disclosed below include power management for an RAU(s) in a distributed antenna system, and related devices, systems, methods, and computer-readable media. Power can be managed for an RAU configured to power modules and devices that may require more power to operate than power available to the RAU. For example, the RAU may be configured to include power-consuming RAU modules to provide distributed antenna system-related services. As another example, the RAU may be configured to provide power through powered ports in the RAU to external power-consuming devices. Depending on the configuration of the RAU, the power-consuming RAU modules and/or external power-consuming devices may demand more power than is available at the RAU. In this instance, the power available at the RAU can be distributed to the power-consuming modules and devices based on the priority of services desired to be provided by the RAU.

Figure 6:
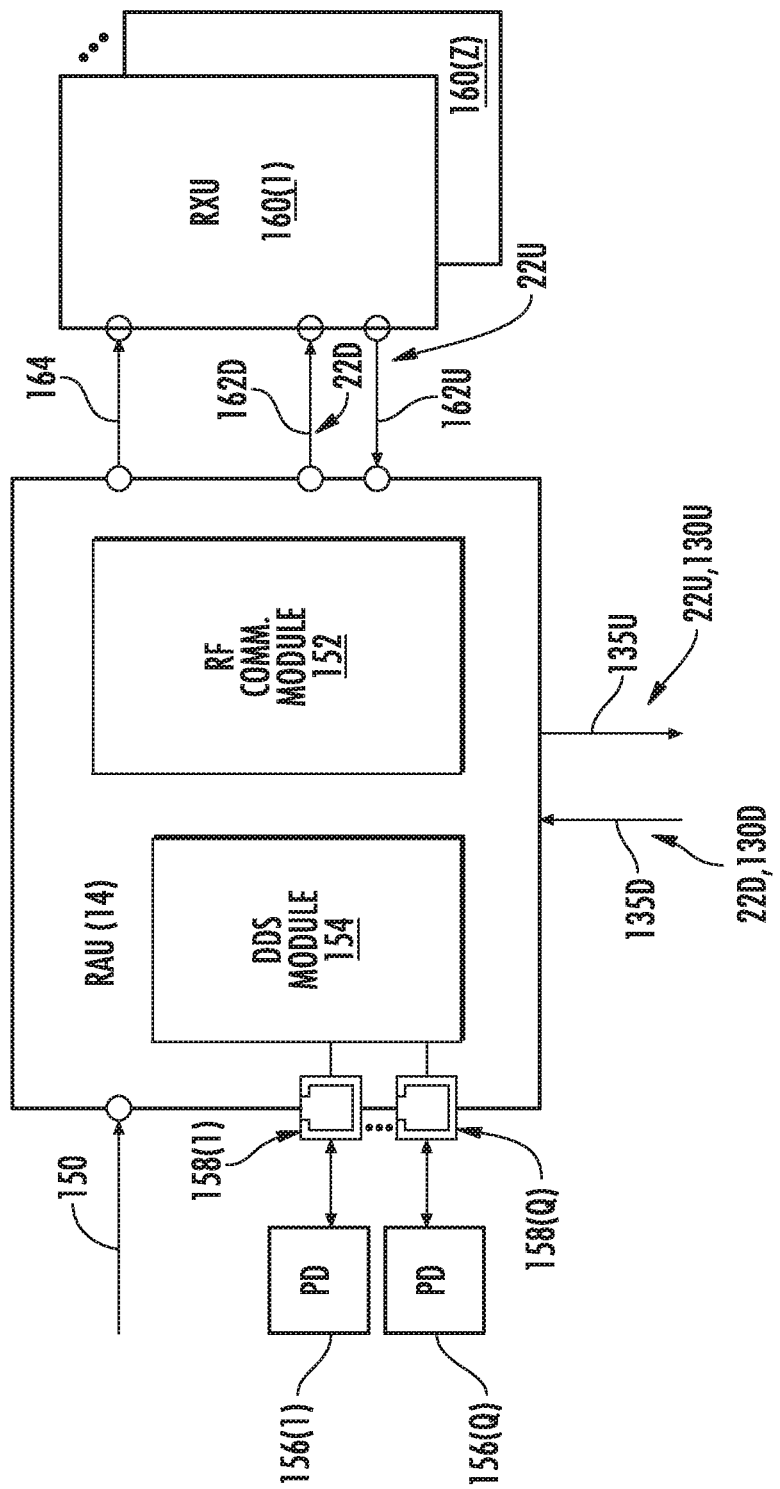
FIG. 6 is a schematic diagram of an exemplary RAU configured with power-consuming components for providing radio frequency (RF) communications services, digital data services, external power to digital data service devices, and a remote expansion unit.

FIG. 6 is a schematic diagram of an exemplary RAU 14 configured with power-consuming components. The RAU 14 is configured to receive power over a power line 150 routed to the RAU 14 from either a local power source or a remote power source to make power available for power-consuming components associated with the RAU 14. As a non-limiting example, the power line 150 may provide a voltage of between forty-eight (48) and sixty (60) Volts at a power rating of between eighty (80) to one hundred (100) Watts. In this example, the RAU 14 includes an RF communications module 152 for providing RF communications services. The RF communications module 152 requires power to operate in this embodiment and receives power from the power line 150. Power from the power line 150 may be routed directly to the RF communications module 152, or indirectly through another module. The RF communications module 152 may include any of the previously referenced components to provide RF communications services, including O/E and E/O conversion.

With continuing reference to FIG. 6, the RAU 14 may also include a DDS module 154 to provide media conversion (e.g., O/E and E/O conversions) and route digital data services received from the DDS switch 127 in FIG. 5 to externally connected power-consuming devices (PDs) 156(1)-156(Q) configured to receive digital data services. Power from the power line 150 may be routed to the RF communications module 152, and from the RF communications module 152 to the DDS module 154. With reference to FIG. 6, the digital data services are routed by the DDS module 154 through communications ports 158(1)-158(Q) provided in the RAU 14. As a non-limiting example, the communications ports 158(1)-158(Q) may be RJ-45 connectors. The communications ports 158(1)-158(Q) may be powered, meaning that a portion of the power from the power line 150 is provided to the powered communications ports 158(1)-158(Q). In this manner, PDs 156(1)-156(Q) configured to receive power through a powered communications port 158 can be powered from power provided to the RAU 14 when connected to the powered communications port 158. In this manner, a separate power source is not required to power the PDs 156(1)-156(Q). For example, the DDS module 154 may be configured to route power to the powered communications ports 158(1)-158(Q) as described in the PoE standard.

With continuing reference to FIG. 6, one or more remote expansion units (RXUs) 160(1)-160(Z) may also be connected to the RAU 14. The RXUs 160(1)-160(Z) can be provided to provide additional RF communications services through the RAU 14, but remotely from the RAU 14. For example, if additional RF communications bands are needed and there are no additional bands available in a distributed antenna system, the RF communications bands of an existing RAU 14 can be expanded without additional communications bands by providing the RXUs 160(1)-160(Z). The RXUs 160(1)-160(Z) are connected to the distributed antenna system through the RAU 14. The RXUs 160(1)-160(Z) can include the same or similar components provided in the RF communications module 152 to receive downlink RF communications signals 162D and to provide received uplink RF communications signals 162U from client devices to the distributed antenna system through the RAU 14. The RXUs 160(1)-160(Z) are also power-consuming modules, and thus in this embodiment, power from the power line 150 is routed by the RAU 14 to the RXUs 160(1)-160(Z) over a power line 164.

The power provided on the power line 150 in FIG. 6 may not be sufficient to provide power for the modules 152, 154, 160(1)-160(Z) and external PDs 156(1)-156(Q) provided in the RAU 14. For example, eighty (80) Watts of power may be provided on the power line 150 in FIG. 6. However, the RF communications module 152 may consume thirty (30) Watts of power, the RXUs 160(1)-160(Z) may consume twenty (20) Watts of power, and the DDS module 154 may consume five (5) Watts of power. This is a total of fifty-five (55) Watts. In this example, twenty-five (25) Watts are available to be shared among the powered communications ports 158(1)-158(Q). However, the PDs 156(1)-156(Q) may be configured to require more power than twenty-five (25) Watts. For example, if the PDs 156(1)-156(Q) are configured according to the PoE standard, power source equipment (PSE) provided in the RAU 14 to provide power to the powered communications ports 158(1)-158(Q) may be required to provide up to 15.4 Watts of power to each powered communications port 158(1)-158(Q). In this example, if more than one powered communications port 158(1)-158(Q) is provided, there will not be sufficient power to power each of the powered communications port 158(1)-158(Q) at 30 Watts (i.e., a PoE Class 4 device).

Thus, to ensure proper operation of the maximum power consuming modules 152, 154, 160(1)-160(Z) possible in an RAU 14, less power could be provided to the powered communications ports 158(1)-158(Q) or only one powered communications port 158(1)-158(Q) could be enabled with power. However, if one of the other modules 152, 154, 160(1)-160(Z) was not present, sufficient power may be available to be provided to each of the powered communications ports 158(1)-158(Q) provided. Further, if a PD 156 connected to a powered communication port 158 is a lower class device that does not require 30 Watts of power, there may be sufficient power available to power the PDs 156(1)-156(Q) connected to each of the powered communications ports 158(1)-158(Q).

Figure 7:
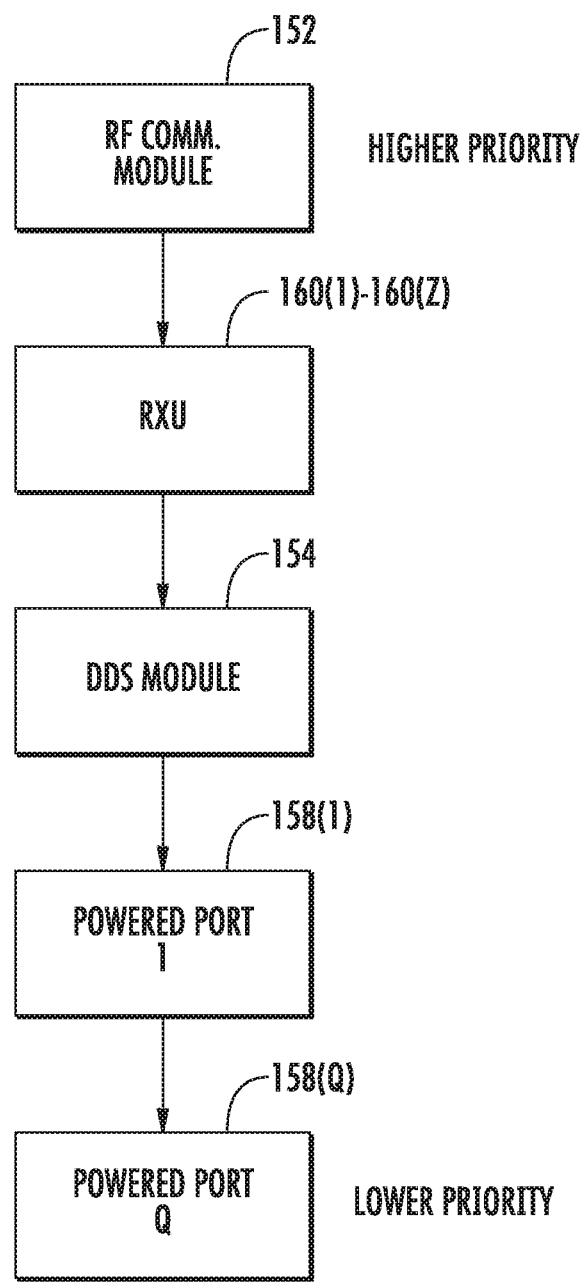
FIG. 7 is an exemplary priority scheme for providing power to power-consuming components that may be present in an RAU.

In this regard, FIG. 7 is an exemplary priority scheme for a power management scheme to provide sufficient power to power-consuming modules and PDs that may be powered by an RAU 14. In this example, RF communications services have been assigned higher priority than digital data services and powered ports. Thus, in this example, the available power on the power line 150 will be made available to the RF communications module 152. If more power is available from the power line 150 after power has been budgeted for the RF communications module 152, the remaining power is made available to the RXUs 160(1)-160(Z) to provide expansion RF communications services. If more power is available from the power line 150 after power has been budgeted for the RF communications module 152 and the RXUs 160(1)-160(Z), the remaining power is made available to the DDS module 154 to provide digital data services. If more power is available from the power line 150 after power has been budgeted for the RF communications module 152, the RXUs 160(1)-160(Z), and the DDS module 154, the remaining power is made available to the powered communications ports 158(1)-158(Q) to provide power to the PDs 156(1)-156(Q). Note that the priority schemed in FIG. 7 is exemplary and any other priority scheme desired could be implemented in a power management scheme.

With continuing reference to FIG. 7, power is budgeted such that power is made available sufficient to power the PD 158(1) connected to the first powered communications port 158(1). If more power is available from the power line 150 after power has been budgeted for the RF communications module 152, the RXUs 160(1)-160(Z), the DDS module 154, and the PD 158(1) connected to the first powered communications port 158(1), power is made available to the other powered communications ports 158(2)-158(Q) until sufficient power is not available to power the PDs 156(2)-156(Q) connected to the additional powered communications ports 158(2)-158(Q). If the remaining power budget is not sufficient to power the PDs 156 connected to any powered communications ports 158, these powered communications ports 158 can be disabled. Further, if any of the modules 152, 154, 160(1)-160(Z) are not present or are removed for a particular RAU 14, the available power budget for the powered communications ports 158(1)-158(Q) may increase thereby allowing previously disabled powered communications ports 158(1)-158(Q) to be enabled.

Figure 8:
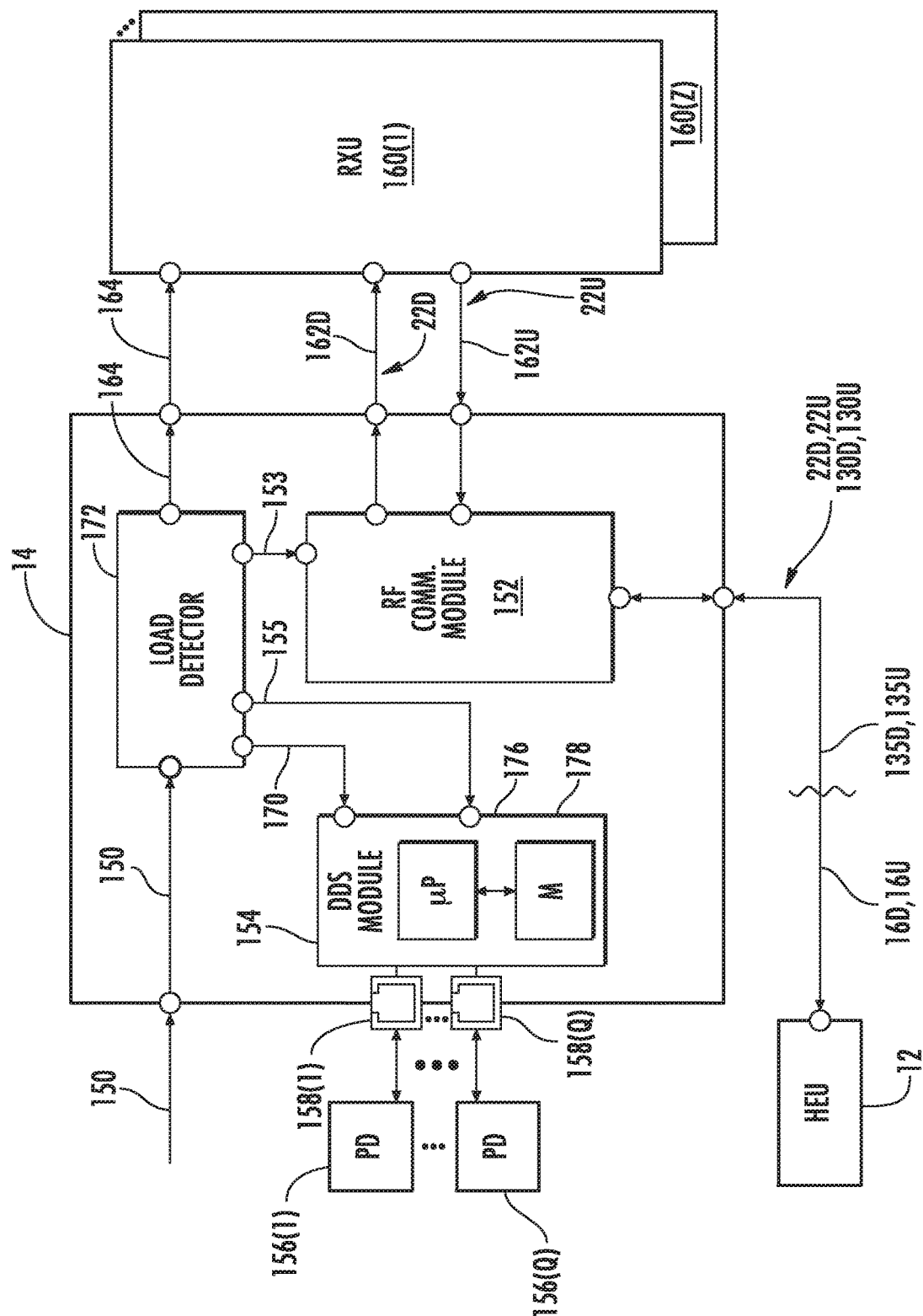
FIG. 8 is a schematic diagram of an exemplary RAU that includes a component(s) for providing local power management of power provided to power-consuming modules and external power-consuming devices connected to the RAU.
Figure 9:
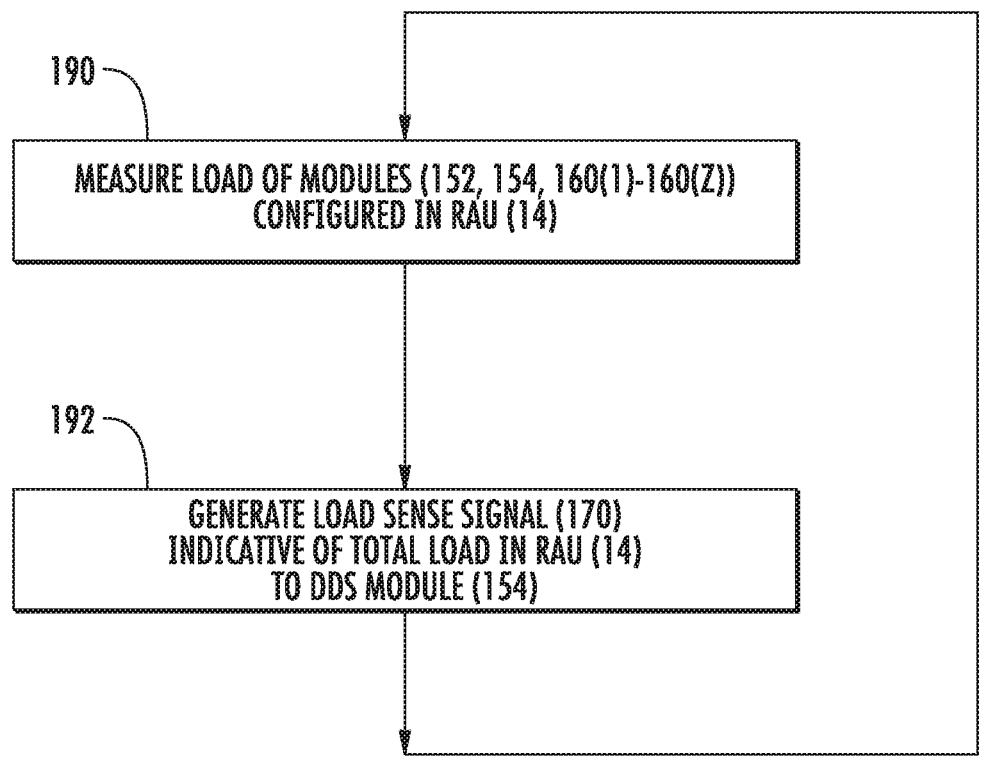
FIG. 9 is a flowchart illustrating an exemplary process for measuring power consumed by the RAU and generating a load sense signal indicative of the power consumed by the RAU for providing local power management.
Figure 10:
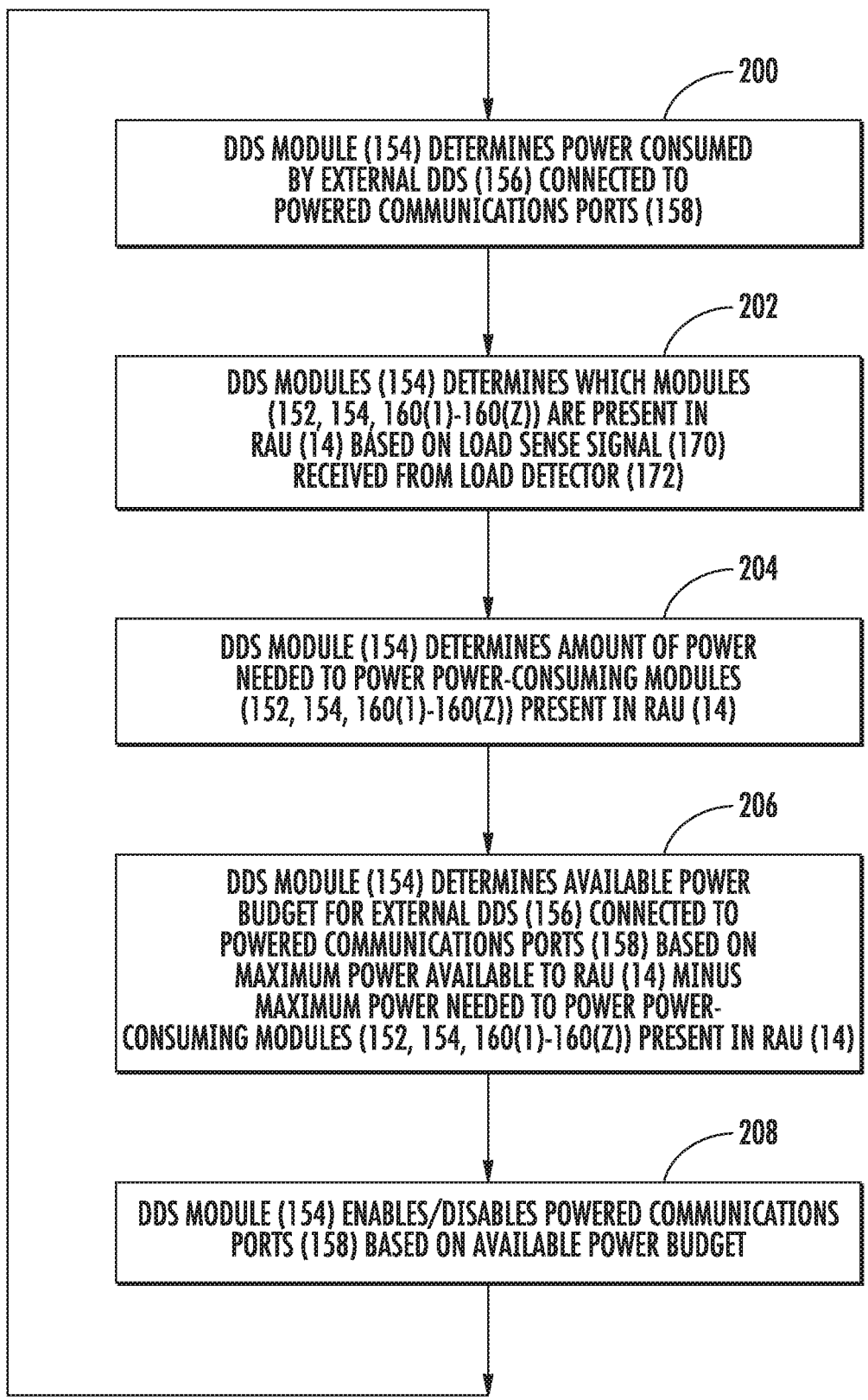
FIG. 10 is a flowchart illustrating an exemplary process for providing local power management of power provided to external power-consuming devices connected to the RAU.

FIG. 8 is a schematic diagram of an exemplary embodiment of components that can be provided in the RAU 14 of FIG. 6 to provide for local power management of power provided to the power-consuming modules 152, 154, 160(1)-160(Z) and the externally connected PDs 156(1)-156(Q). The discussion of local power management of the RAU 14 in FIG. 8 will be described in conjunction with the flowcharts in FIGS. 9 and 10. FIG. 9 is a flowchart illustrating an exemplary process for measuring power consumed by the RAU 14 and generating a load sense signal 170 in FIG. 8 indicative of the power consumed by the RAU 14 for providing local power management. FIG. 10 is a flowchart illustrating an exemplary process for providing local power management of power provided to external PDs 156(1)-156(Q) connected to the RAU 14.

With reference to FIGS. 8-10, the RAU 14 includes a power or load detector 172. The load detector 172 can be comprised of load detection circuitry or any other type of detector configured to detect the load of the modules 152, 154, 160(1)-160(Z) configured in the RAU 14 (block 190 in FIG. 9). The load sense signal 170 indicative of the load of the modules 152, 154, 160(1)-160(Z) present in the RAU 14 is communicated to the DDS module 154 (block 192 in FIG. 9). Because the loads of the various combinations and configurations of the modules 152, 154, 160(1)-160(Z) that can be provided in the RAU 14 are unique, it can be determined from the load sense signal 170 which of the modules 152, 154, 160(1)-160(Z) are actually present in an RAU 14, and thus the amount of power needed to sufficiently power the modules 152, 154, 160(1)-160(Z) present in the RAU 14. By knowing the maximum power available to the RAU 14 and the power needed to sufficiently power the modules 152, 154, 160(1)-160(Z) present in the RAU 14, the amount of remaining available power that can be provided to the PDs 156(1)-156(Q) connected to the powered communications ports 158(1)-158(Q) can be determined, as discussed, by example, in FIGS. 10 and 11 below.

The DDS module 154 determines the power consumed by the external PDs 156(1)-156(Q) connected to the powered communications ports 158(1)-158(Q) (block 200 in FIG. 10). For example, the DDS module 154 in this embodiment in FIG. 8 includes a controller 176 that is coupled to memory 178 for executing instructions to perform operations described herein to determine the available power budget available for the PDs 156(1)-156(Q) and to enable the appropriate powered communications ports 158(1)-158(N). The DDS module 154 then determines which modules 152, 154, 160(1)-160(Z) are present in the RAU 14 based on the load sense signal 170 received from the load detector 172 (block 202 in FIG. 10). For example, the controller 176 in the DDS module 154 could perform a look up in memory 178 that contains the loads for the combinations of the modules 152, 154, 156 present in the RAU 14. The DDS module 154 then determines the amount of power needed to power the modules 152, 154, 160(1)-160(Z) present in the RAU 14 by performing another look up in memory 178 that contains the maximum power required to power the modules 152, 154, 160(1)-160(Z) (block 204 in FIG. 10).

With reference to FIG. 10, the DDS module 154 determines the available power budget for providing power to the external PDs 156(1)-156(Q) connected to the powered communications ports 158(1)-158(Q) based on the maximum power available to the RAU 14 from the power line 150 minus the maximum power needed to provide power to the modules 152, 154, 160(1)-160(Z) present in the RAU 14 (block 206). The DDS module 154 then enables or disables the powered communications ports 158(1)-158(Q) based on the available power budget (block 208). The powered communications ports 158(1)-158(Q) are enabled or disabled depending on the class of the external PDs 156(1)-156(Q) connected to the powered communications ports 158(1)-158(Q). For example, if the available power budget is 14 Watts, a PoE Class 3 PD 156 requiring 15.4 Watts connected to a powered communications port 158 cannot be powered, and thus the powered communications port 158 is disabled. However, if a PoE Class 2 or lower PD 156 requiring 7 Watts or less is connected to a powered communications port 158, the powered communications port 158 can be enabled since the available power budget is greater than 7 Watts. The DDS module 154 enables each powered communications port 158(1)-158(Q) having a connected PD 156(1)-156(Q) until the available remaining power budget is no longer sufficient to enable any further powered communications ports 158(1)-158(Q).

Figure 11:
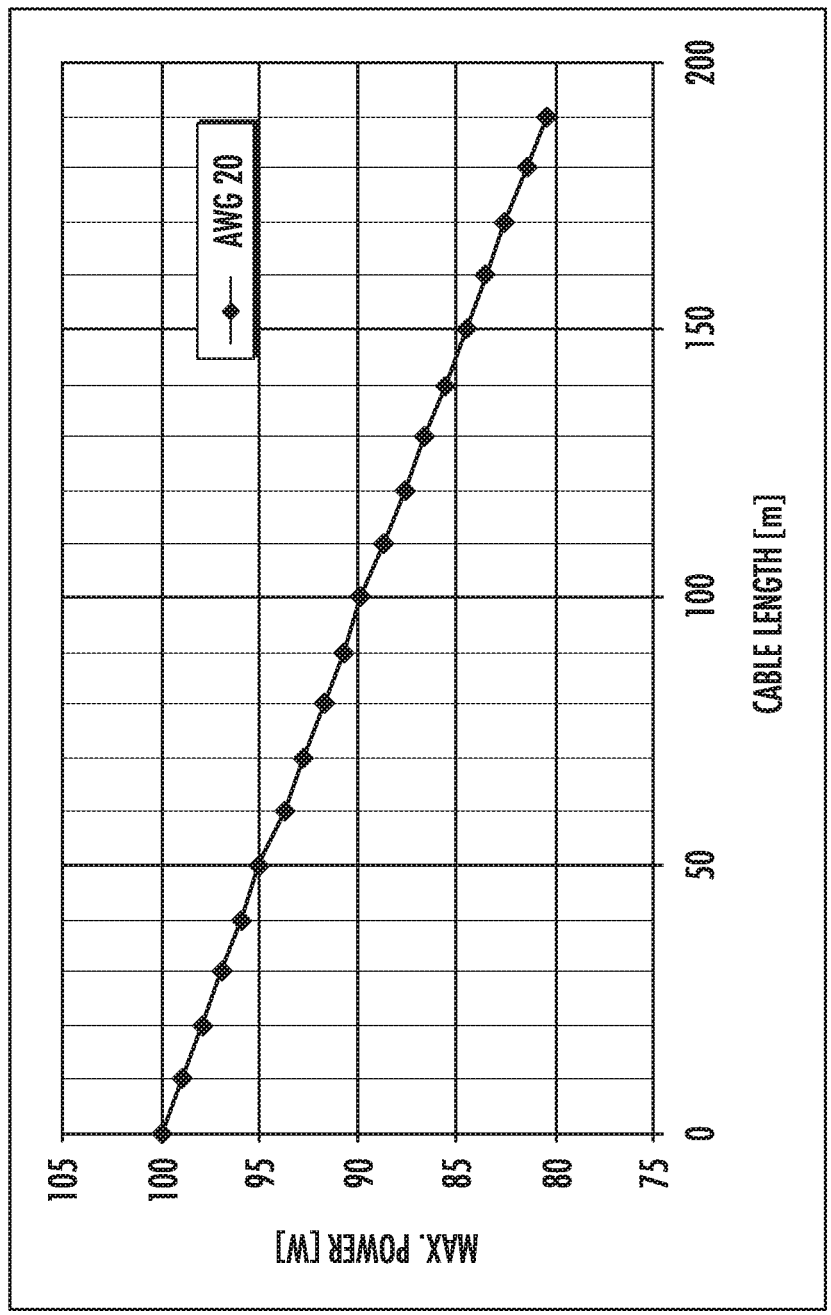
FIG. 11 is a schematic diagram illustrating an exemplary relationship between power degradation as a function of cable length.
Figure 12:
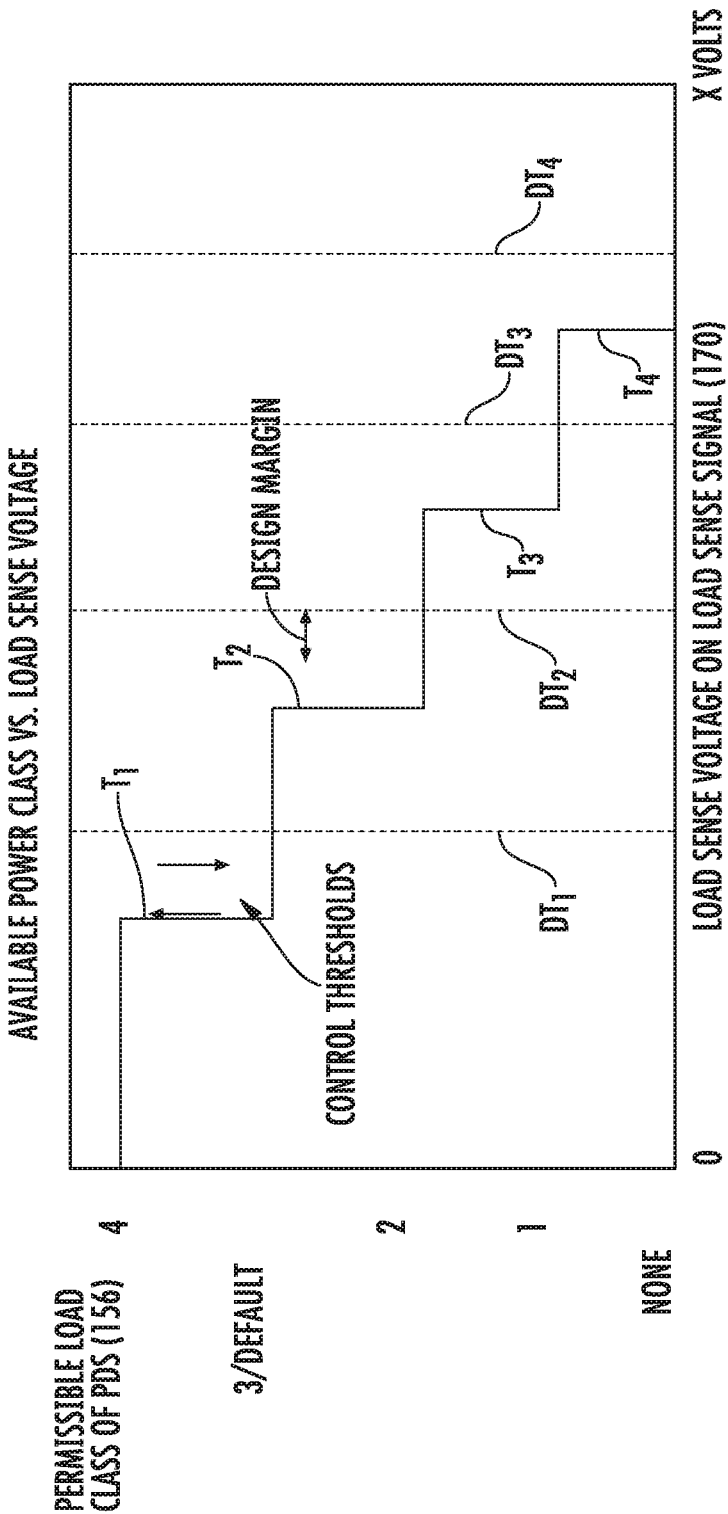
FIG. 12 is a schematic diagram illustrating an exemplary relationship between load voltage and available classes for external power-consuming devices connected to the RAU.

If the available power at an RAU 14 is known, the load sense signal 170 can be used directly to determine which load classes of PDs 156 are available to be powered by the RAU 14 through the powered communications port 158. For example, as illustrated in the example of FIG. 11, the length of the cable provided between the power source for the RAU 14 and the RAU 14 provides a predictable power degradation. This predictable power degradation can be provided in memory 178 in the DDS module 154 in FIG. 8 so that the DDS module 154 can determine the maximum power available to the RAU 14 inferentially if the maximum power provided by the power source is known and stable and also programmed into the memory 178 or otherwise made available. In this regard, FIG. 12 is a schematic diagram illustrating an exemplary relation between load voltage and available classes for external PDs 156 connected to an RAU 14. As illustrated therein, as the load sense voltage present on the load sense signal 170 increases, the available power budget decreases. Thus, the lower the class of PD 156 can be powered. Thresholds $T_1$-$T_4$ in the load sense voltage show boundaries where the load sense voltage of the load sense signal 170 significantly increases in stair-step fashion illustrating an additional module 152, 154, 160(1)-160(Z) present in the RAU 14. To take into account design margins, thresholds or boundaries $DT_1$-$DT_4$ are provided. If the load sense voltage of the load sense signal 170 moves beyond a threshold $DT_1$-$DT_4$, the highest class of PD 156 that can be powered is lowered to the next lowest class.

Figure 13:
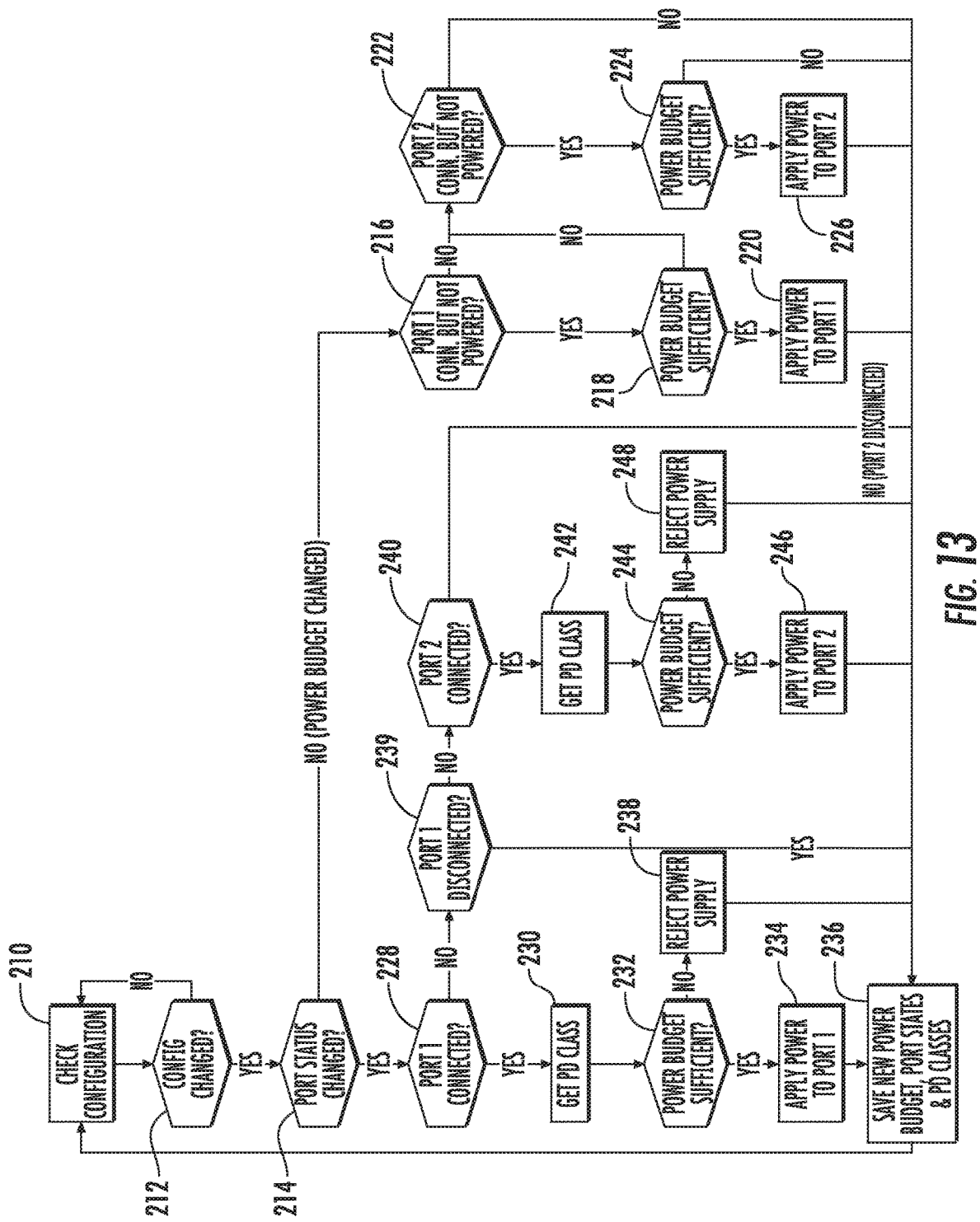
FIG. 13 is a flowchart illustrating another exemplary process for providing local power management of power provided to external power-consuming devices connected to the RAU.

FIG. 13 is a flowchart illustrating another exemplary power management process that can be provided by the RAU 14 to manage power provided to PDs 156(1)-156(Q) when the status of the powered communications ports 158(1)-158(Q) provided in an RAU 14 changed (i.e., connected or disconnected). If the status of any powered communications port 158(1)-158(Q) has increased power requirements, such as by a new connection or a connection with a PD 156 requiring more power, other powered communications ports 158(1)-158(Q) may be required to be disabled to remain within the available power budget. If the status of any powered communications ports 158(1)-158(Q) has decreased power requirements, other powered communications ports 158(1)-158(Q) may be able to be enabled and still remain within the available power budget.

With reference to FIG. 13, the controller 176 determines if the configuration of the RAU 14 has changed (block 210). If changed (block 212), the controller 176 determines if the change is due to a change in status of a powered communications port 158(1)-158(Q) in the RAU 14 (block 214). In this example, power is managed for two (2) powered communications ports 158(1), 158(2), but any number could be managed. If a powered communications port 158(1)-158(Q) has not changed, this means that the available power budget to provide power to the PDs 156(1)-156(Q) has changed since at least one module 152, 154, 160(1)-160(Z) has either been removed or added to the RAU 14. In this instance, the controller 176 determines if a PD 156(1) is connected to the first powered communications port 158(1) that is unpowered (block 216). If so, the controller 176 determines if the available power budget is sufficient to provide power to the PD 156(1) connected to the first powered communications port 158(1) (block 218). If so, the controller 176 directs the PSE 170 to provide power to the first powered communications port 158(1) (block 220). If not, the controller 176 checks the status of the second powered communications port 158(2) (block 222).

If the controller 176 determines that the first powered communications port 158(1) is not powered (block 216), the controller 176 determines if a PD 156(2) is connected to a second powered communications port 158(2) that is unpowered (block 222). If so, the controller 176 determines if the available power budget is sufficient to provide power to the PD 156(2) connected to the second powered communications port 158(2) (block 224). If so, the controller 176 directs the PSE 170 to provide power to the second powered communications port 158(2) (block 226). If not, the controller 176 does not change the power configuration of the second powered communications port 158(2). Thus, the controller 176 manages power to by enabling a first powered communications port 158(1) if available power budget is present, and then enabling a second powered communications port 158(2) if available power budget is available after providing power to the first powered communications port 158(1). When the available power budget changes for the RAU 14, the enabling or disabling of the powered communications ports 158(1), 158(2) is re-evaluated based on the available power budget.

If the status of the powered communications ports 158(1), 158(2) has changed (block 214), the current power settings of the powered communications ports 158(1), 158(2) is also re-evaluated. In this regard, if the first powered communications port 158(1) is connected (block 228), the controller 176 obtains the class of the PD 156(1) connected to the powered communications port 158(1) from the PSE 170 (block 230). The controller 176 determines if the available power budget is sufficient to power the PD 156(1) at its class rating (block 232). If so, the controller 176 directs the PSE 170 to enable the powered communications port 158(1) to provide power to the PD 156(1) connected to the powered communications port 158(1) (block 234). For example, if the available power budget is 16 Watts, a PoE Class 3 PD 156(1) rated at 15.4 Watts connected to a powered communications port 158(1) can be powered, and thus the powered communications port 158(1) is enabled. However, if a PoE Class 4 PD 156(1) rated at 30 Watts or less is connected to a powered communications port 158(1), the powered communications port 158(1) is disabled since the available power budget is less than 30 Watts.

The available power budget for the RAU 14 is updated by the controller 176 in memory 178 based on the class of the PD 156(1) connected to the powered communications port 158(1) (block 236) so that power is not directed to the second powered communications port 158(2) if there is not sufficient power budget remaining. If the available power budget is not sufficient to power the PD 156(1) connected to the powered communications port 158(1) (block 232), the controller 176 disables the powered communications port 158(1) so that power is not made available by the PSE 170 to the powered communications port 158(1) (block 238).

If a PD 156(1) is not connected to the first powered communications port 158(1) (block 228), the controller 176 determines if the first powered communications port 158(1) is disconnected (block 239). If not, the controller 176 determines if a PD 156(2) is connected to the second powered communications port 158(2) (block 240). If so, the controller 176 obtains the class of the PD 156(2) connected to the powered communications port 158(2) from the PSE 170 (block 242). The controller 176 determines if the available power budget is sufficient to power the PD 156(2) at its class rating (block 244). If so, the controller 176 directs the PSE 170 to enable the powered communications port 158(2) to provide power to the PD 156(2) connected to the powered communications port 158(2) (block 246). The available power budget for the RAU 14 is updated by the controller 176 in memory 178 based on the class of the PD 156(2) connected to the powered communications port 158(2) (block 236) to so that power is not directed to the other powered communications port 158(1) if there is not sufficient power budget remaining. If the available power budget is not sufficient to power the PD 156(2) connected to the powered communications port 158(2) (block 244), the controller 176 disables the powered communications port 158(2) so that power is not made available by the PSE 170 to the powered communications port 158(2) (block 248).

Figure 14:
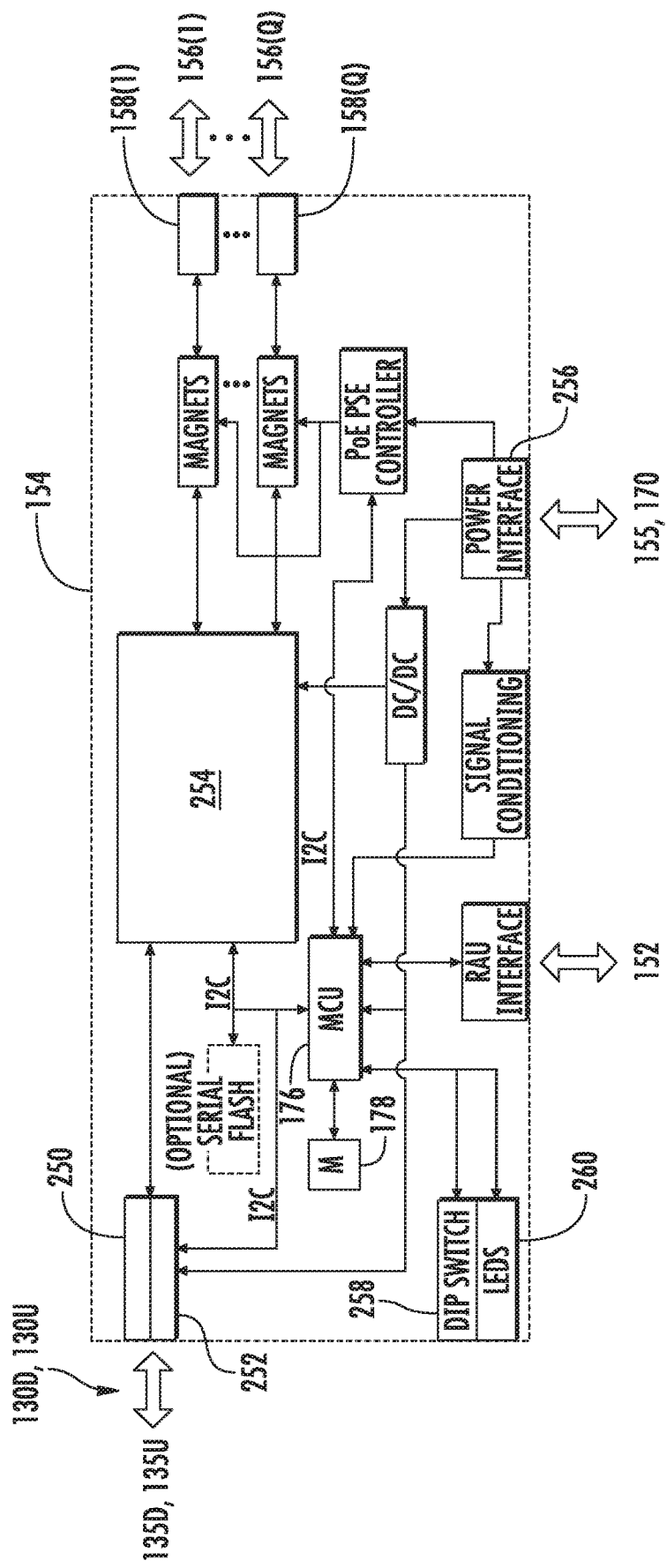
FIG. 14 is an exemplary digital data services (DDS) module that can be provided in the RAU to provide digital data services at the RAU.

FIG. 14 is a more detailed diagram of one embodiment of the DDS module 154 in FIG. 8 that can be provided in an RAU 14 to provide digital data services to the PDs 156(1)-156(Q) connected to the powered communications ports 158(1)-158(Q) and to provide power management for the powered communications ports 158(1)-158(Q), as described above. As illustrated in FIG. 14, the DDS module 154 includes a transmit optical sub-assembly (TOSA) 250 and a receive optical sub-assembly (ROSA) 252 to convert downlink optical digital signals 130D from the downlink optical fiber 135D to downlink electrical digital signals and convert uplink electrical digital signals to uplink optical digital signals 130U. A DDS switch 254 is provided to switch digital data services to the powered communications ports 158(1)-158(Q). The controller 176 is provided as a PoE PSE controller to manage power provided to the powered communications ports 158(1)-158(Q). A power interface 256 is provided to receive power from a power line 155 and the load sense signal 170 from the load detector 172. Switches 258 and light emitting diodes (LEDs) 260 are provided to allow configuration settings and to provide a status of the DDS module 174, respectively.

Figure 15:
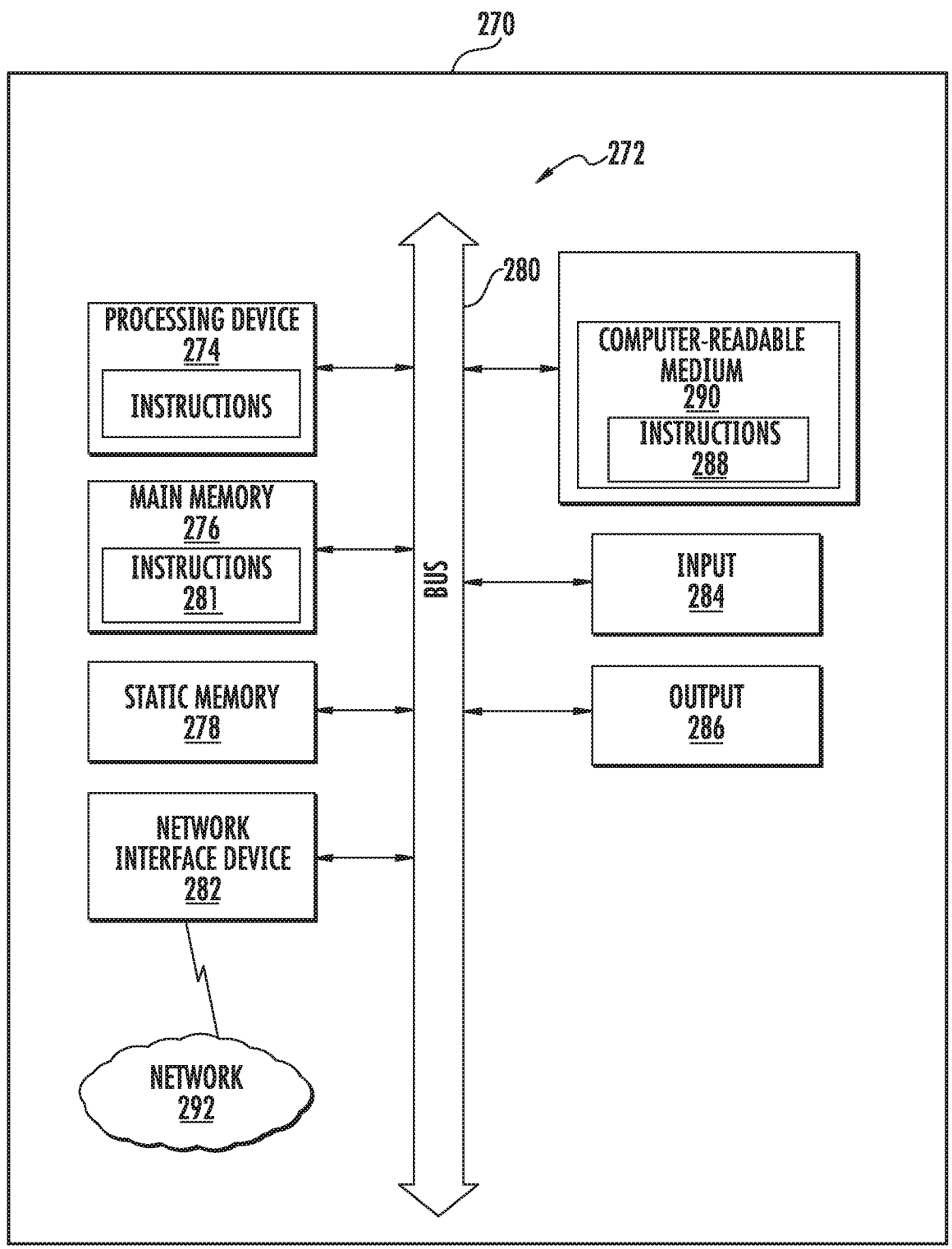
FIG. 15 is a schematic diagram of a generalized representation of an exemplary computer system that can be included in the RAU and/or a power-consuming RAU module, which is adapted to execute instructions from an exemplary computer-readable medium to perform the power management functions in the RAU.

FIG. 15 is a schematic diagram representation of an exemplary electronic device 270 in the exemplary form of an exemplary computer system 272 adapted to execute instructions from an exemplary computer-readable medium to perform power management functions. The electronic device 270 may be the DDS module 154, but could be any other module or device provided in the RAU 14. The electronic device 270 could be provided separately from the other modules 152, 154, 160(1)-160(Z) that can be configured for the RAU 14. In this regard, the electronic device 270 may comprise a computer system 272 within which a set of instructions for causing the electronic device 270 to perform any one or more of the methodologies discussed herein may be executed. The electronic device 270 may be connected (e.g., networked) to other machines in a LAN, an intranet, an extranet, or the Internet. The electronic device 270 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The electronic device 270 may be a circuit or circuits included in an electronic board card, such as a printed circuit board (PCB) as an example, server, a personal computer, a desktop computer, a laptop computer, a personal digital assistant (PDA), a computing pad, a mobile device, or any other device, and may represent, for example, a server or a user's computer.

The exemplary computer system 272 includes a processing device or processor 274, a main memory 276 (e.g., read-only memory (ROM), flash memory, dynamic random access memory (DRAM) such as synchronous DRAM (SDRAM), etc.), and a static memory 278 (e.g., flash memory, static random access memory (SRAM), etc.), which may communicate with each other via a bus 280. Alternatively, the processing device 274 may be connected to the main memory 276 and/or static memory 278 directly or via some other connectivity means. The processing device 274 may be the controller 176, and the main memory 276 or static memory 278 may be the memory 178.

The processing device 274 represents one or more general-purpose processing devices such as a microprocessor, central processing unit, or the like. More particularly, the processing device 274 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 274 is configured to execute processing logic in instructions 281 for performing the operations and steps discussed herein.

The computer system 272 may further include a network interface device 282. The computer system 272 also may or may not include an input 284 to receive input and selections to be communicated to the computer system 272 when executing instructions. The computer system 272 also may or may not include an output 286, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 272 may or may not include a data storage device that includes instructions 288 stored in a computer-readable medium 290 embodying any one or more of the RAU power management methodologies or functions described herein. The instructions 288 may also reside, completely or at least partially, within the main memory 276 and/or within the processing device 274 during execution thereof by the computer system 272, the main memory 276 and the processing device 274 also constituting computer-readable media. The instructions 288 may further be transmitted or received over a network 292 via the network interface device 282.

While the computer-readable medium 290 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic media, and carrier wave signals.

The DDS modules disclosed herein may be provided any type of digital data services. The powered communications ports provided in the RAU may be provided to meet any power standard. In the example of PoE, IEEE 802.3at specifies that link layer discovery protocol (LLDP) may be used and supported by the components described herein, including the controllers and power management components in the RAUs. LLDP allows exchange of data with PDs to determine the power rating of the PD. Also, more precise information regarding power requirements can only be exchanged using LLDP for media endpoint devices, such as LLDP-MED, according to TIA-1057). LLDP-MED allows requesting of power by PDs between 0 and 102.3 Watts in 0.1 Watt steps. LLDP and LLDP-MED are layer 2 protocols, which require a means to receive and transmit those Ethernet packets from and to PDs. This can be performed by the controllers disclosed herein and provided in the RAUs having an Ethernet media access controller connected to an Ethernet switch inside the media converter. Alternatively, power ratings for a PD could be provided manually or programmed into the RAUs by an operator accessing the RAUs in the distributed antenna system.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage media, optical storage media, flash memory devices, etc.), a machine-readable transmission medium (electrical, optical, acoustical or other form of propagated signals (e.g., carrier waves, infrared signals, digital signals, etc.), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as used herein, it is intended that the terms "fiber optic cables" and/or "optical fibers" include all types of single mode and multi-mode light waveguides, including one or more optical fibers that may be upcoated, colored, buffered, ribbonized and/or have other organizing or protective structures in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings.

What is claimed is:

1. A powered remote unit comprising:
   at least one power-consuming remote unit module comprising:
      at least one electrical-to-optical (E/O) converter configured to convert received uplink radio frequency (RF) communications signals from a coverage area to uplink optical communications signals;
      at least one optical-to-electrical (O/E) converter; and
      an RF communications module configured to receive the uplink RF communications and to provide RF communications services to the coverage area;
   at least one powered port configured to provide power to at least one external power-consuming device connected to the at least one powered port; and
   a controller configured to:
      based on an available power for the at least one powered port, selectively disable the at least one powered port based on a power required by the at least one external power-consuming device connected to the at least one powered port, wherein
      the controller is configured to determine the available power based at least in part upon the power required by the at least one power-consuming remote unit module.

2. The powered remote unit of claim 1, wherein the controller is configured to determine the available power based on a total power available minus the power required by the at least one power-consuming remote unit module.

3. The powered remote unit of claim 2, wherein the at least one powered port is comprised of a plurality of powered ports.

4. The powered remote unit of claim 2, wherein the remote unit is configured to receive power provided at a voltage in the range of forty-eight (48) to sixty (60) Volts.

5. The powered remote unit of claim 2, wherein at least one of the plurality of powered ports is a Power-over-Ethernet (PoE) port.

6. The powered remote unit of claim 1, wherein the controller is configured to determine which at least one power-consuming remote unit module is present by subtracting power consumed by the at least one external power-consuming device from a total power available.

7. The powered remote unit of claim 6, wherein the remote unit is configured to receive power provided at a voltage in the range of forty-eight (48) to sixty (60) Volts.

8. The powered remote unit of claim 1, wherein the remote unit is configured to receive power provided at a voltage in the range of forty-eight (48) to sixty (60) Volts.

9. The powered remote unit of claim 1, wherein the at least one powered port is comprised of at least one Power-over-Ethernet (PoE) port.

10. A powered remote unit comprising:
   at least one electrical-to-optical (E/O) converter configured to convert received uplink radio frequency (RF) communications signals to uplink optical communications signals;
   at least one optical-to-electrical (0/E) converter configured to convert received downlink optical RF communications signals to downlink electrical communications signals;
   at least one antenna configured to receive the downlink electrical communications signals and to provide RF communications services wirelessly to the coverage area;
   a plurality of powered ports, at least one powered port configured to provide power to at least one external power-consuming device connected to the at least one powered port; and
   a controller configured to, based on an available power for the at least one powered port, selectively disable the at least one powered port based on a comparison of the available power for the at least one powered port and the power required by the at least one external power-consuming module at the at least one powered port.

11. The powered remote unit of claim 10, further comprising a load detector configured to provide a load sense signal to the controller indicative of a power consumed by the at least one external power-consuming device.

12. The powered remote unit of claim 11, wherein at least one of the plurality of ports is a Power-over-Ethernet (PoE) port.

13. The powered remote unit of claim 12, wherein the remote unit is configured to receive power provided at a voltage in the range of forty-eight (48) to sixty (60) Volts.

14. The powered remote unit of claim 10, wherein the remote unit is configured to receive power provided at a voltage in the range of forty-eight (48) to sixty (60) Volts.

15. The powered remote unit of claim 10, wherein at least one of the plurality of ports is a Power-over-Ethernet (PoE) port.

16. A powered remote unit for a wireless communication system, comprising:
   at least one power-consuming remote unit module comprising:
      at least one electrical-to-optical (E/O) converter configured to convert received uplink radio frequency (RF) communications signals from a coverage area to uplink optical communications signals;
      at least one optical-to-electrical (O/E) converter; and
      an RF communications module having at least one antenna configured to receive the uplink RF communications signals and to provide RF communications services to the coverage area;
   a plurality of powered ports configured to provide power to at least one external power-consuming device connected to the plurality of powered ports; and
   a controller configured to selectively enable power for the plurality of powered ports if an available power is sufficient to power the at least one external power-consuming device connected to the plurality of powered ports.

17. The powered remote unit of claim 16, further comprising a load detector configured to provide a load sense signal to the controller indicative of a total power consumed by the at least one power-consuming remote unit module and the at least one external power-consuming device.

18. The RAU according of claim 17, wherein at least one of the plurality of powered ports is a Power-over-Ethernet (PoE) port.

19. The RAU according of claim 16, wherein at least one of the plurality of powered ports is a Power-over-Ethernet (PoE) port.

* * * * *

UNITED STATES PATENT AND TRADEMARK OFFICE
CERTIFICATE OF CORRECTION

PATENT NO. : 10,750,442 B2
APPLICATION NO. : 16/534094
DATED : August 18, 2020
INVENTOR(S) : Christian Heidler et al.

It is certified that error appears in the above-identified patent and that said Letters Patent is hereby corrected as shown below:

On the Title Page

In Column 2, item (56), Other Publications, Line 1, delete "Interantional" and insert -- International --, therefor.

On page 3, in Column 2, item (56), Other Publications, Line 1, delete "Interantional" and insert -- International --, therefor.

On page 3, in Column 2, item (56), Other Publications, Line 3, delete "Interantional" and insert -- International --, therefor.

On page 3, in Column 2, item (56), Other Publications, Line 6, delete "14" and insert -- 44 --, therefor.

In the Claims

In Column 25, Line 17, Claim 10, delete "(0/E)" and insert -- (O/E) --, therefor.

In Column 26, Line 35, Claim 18, delete "according".

In Column 26, Line 38, Claim 19, delete "according".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*